(12) United States Patent
Andreasen et al.

(10) Patent No.: US 8,320,329 B2
(45) Date of Patent: Nov. 27, 2012

(54) POLICY FOR A ROAMING TERMINAL BASED ON A HOME INTERNET PROTOCOL (IP) ADDRESS

(75) Inventors: Flemming Andreasen, Marlboro, NJ (US); Kent Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1021 days.

(21) Appl. No.: 12/054,353

(22) Filed: Mar. 24, 2008

(65) Prior Publication Data

US 2009/0239531 A1  Sep. 24, 2009

(51) Int. Cl.
    *H04J 3/16* (2006.01)
(52) U.S. Cl. ........ 370/331; 370/338; 370/352; 370/466; 455/436
(58) Field of Classification Search .............. 455/436, 455/428; 370/231, 395.21, 331, 328, 392
    See application file for complete search history.

(56) References Cited

U.S. PATENT DOCUMENTS

| 2004/0066764 A1* | 4/2004 | Koodli et al. ............... 370/331 |
| 2007/0184854 A1* | 8/2007 | Niemenmaa et al. ...... 455/456.1 |
| 2007/0226775 A1  | 9/2007 | Andreasen et al. |
| 2009/0197597 A1* | 8/2009 | Kotecha ..................... 455/433 |

OTHER PUBLICATIONS

3rd Generation Partnership Project, Policy and Charging Control over Gx reference point (Release 7), http://www.3gpp.org/ftp/Specs/archive/29_series/29.212/, Jan. 1, 2007, Publisher: 3rd Generation Partnership Project, Published in: Valbonne—France.

Cisco Systems, Inc., Supporting the IP Multimedia Subsystem for Mobile, Wireline, and Cable Providers, http://www.cisco.com/application/pdf/en/us/guest/netsol/ns549/c654/cdccont_0900aecd80395cb0.pdf, Jan. 1, 2006, Publisher: Cisco Systems, Inc., Published in: San Jose, CA US.

Noh, J. et al., Industry Team Advances Wireless IP Communications Through Design of an Advanced Mobile Comms Architecture A-IMS, Press Release, Jul. 27, 2006, p. 4, Publisher: Cisco Systems, Inc., Published in: Basking Ridge, NJ, US.

* cited by examiner

*Primary Examiner* — Ajit Patel
*Assistant Examiner* — Julio Perez
(74) *Attorney, Agent, or Firm* — Patent Capital Group

(57) ABSTRACT

In one embodiment, a method includes receiving, at a visited network node, policy for a roaming terminal from a home network of the roaming terminal. The policy is associated with a home Internet Protocol (IP) address of the roaming terminal. The visited network node applies the policy in the visited network to data packets that include the home IP address. Applying the policy to a data packet encompasses either enforcing the policy at the node that applies the policy or sending data that indicates the policy to a different node that applies the policy based on the data sent, or both.

25 Claims, 13 Drawing Sheets

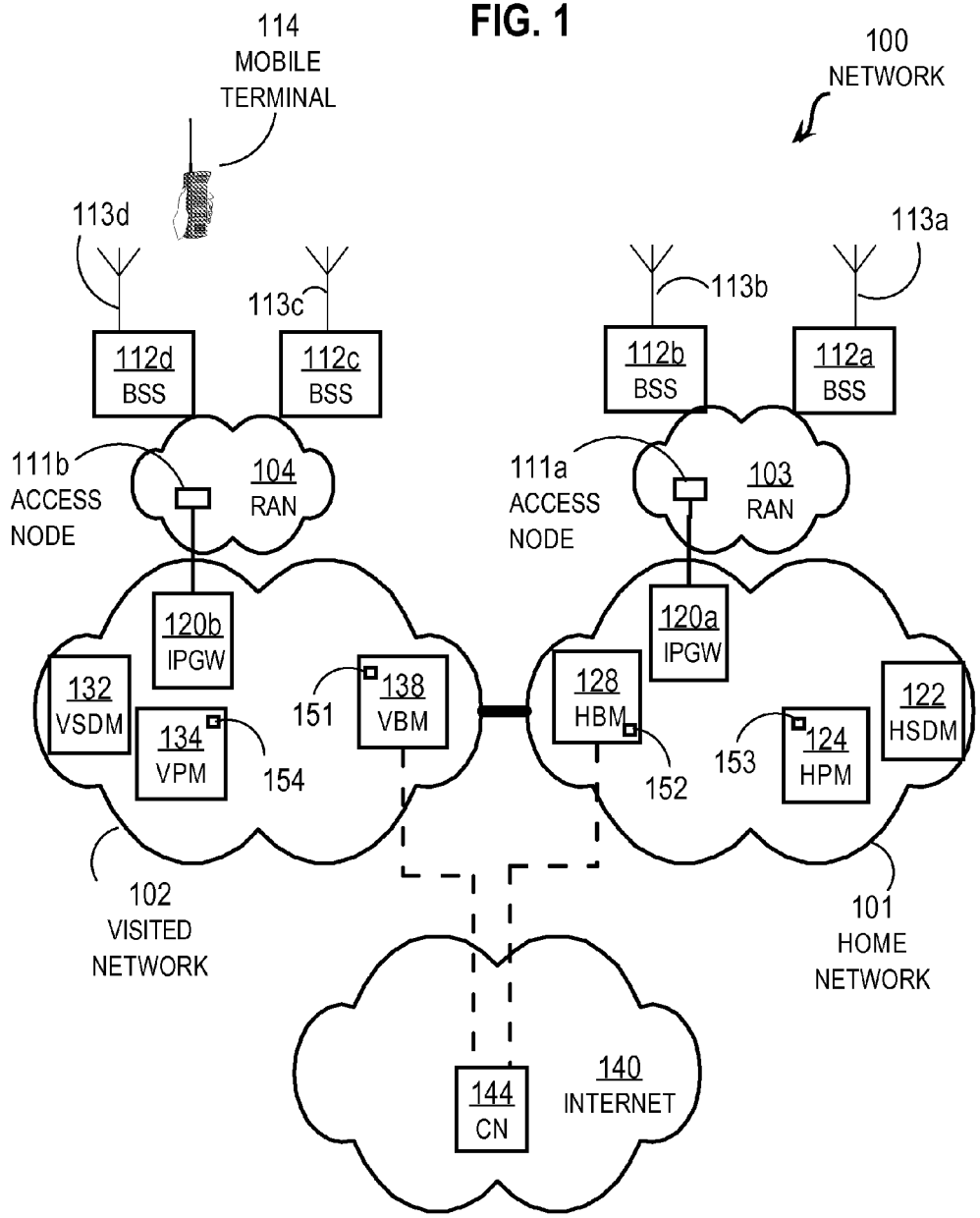

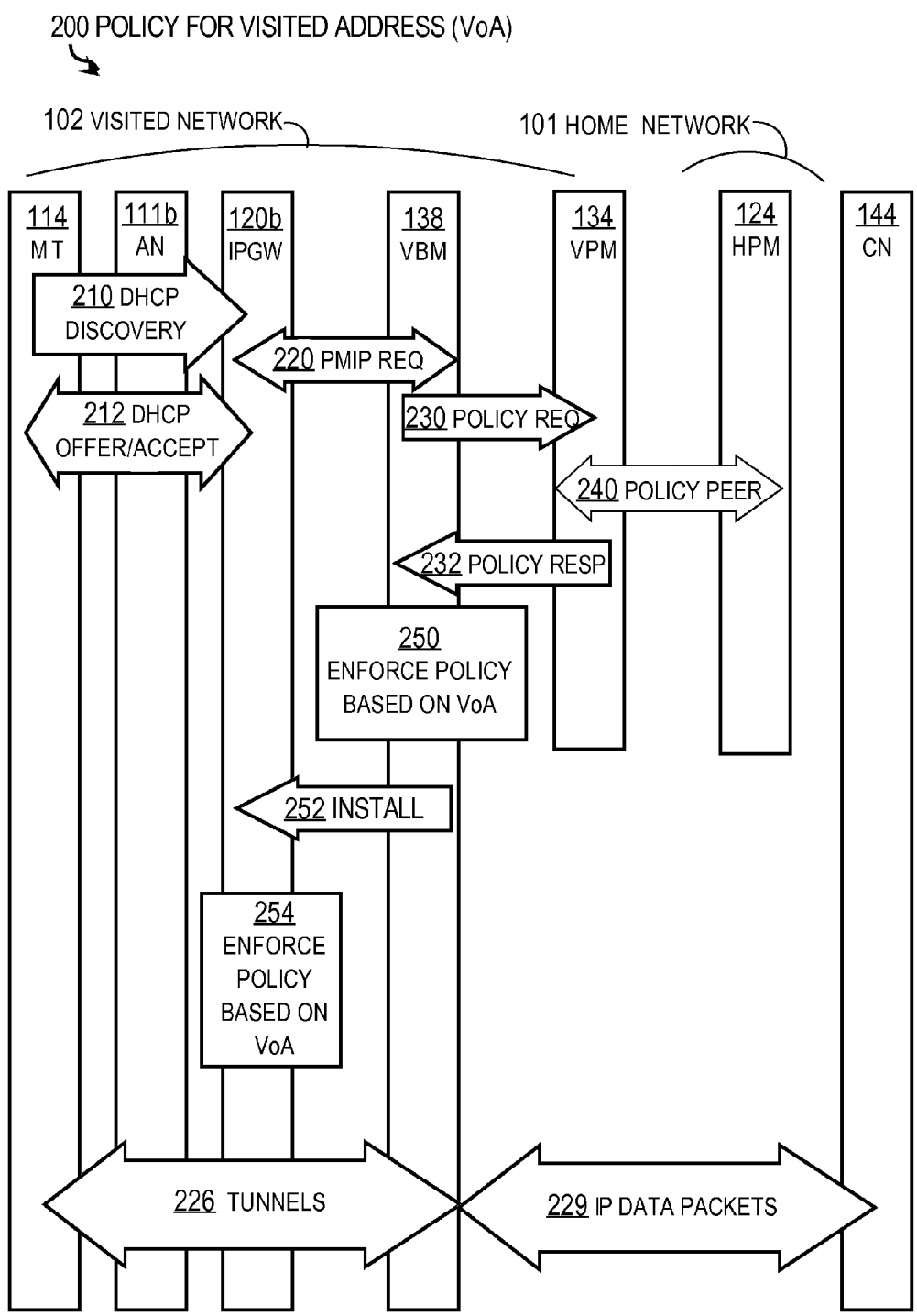

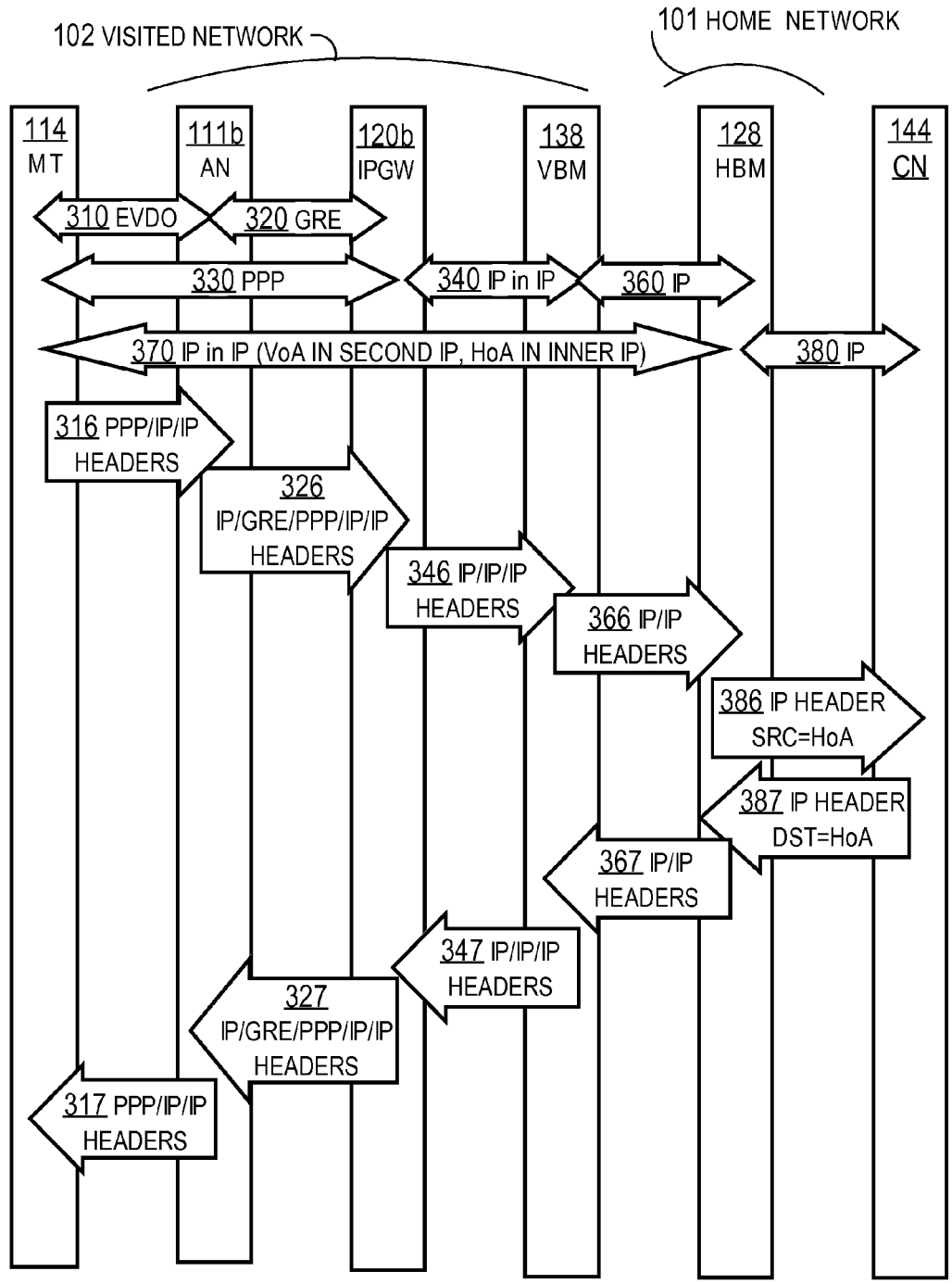

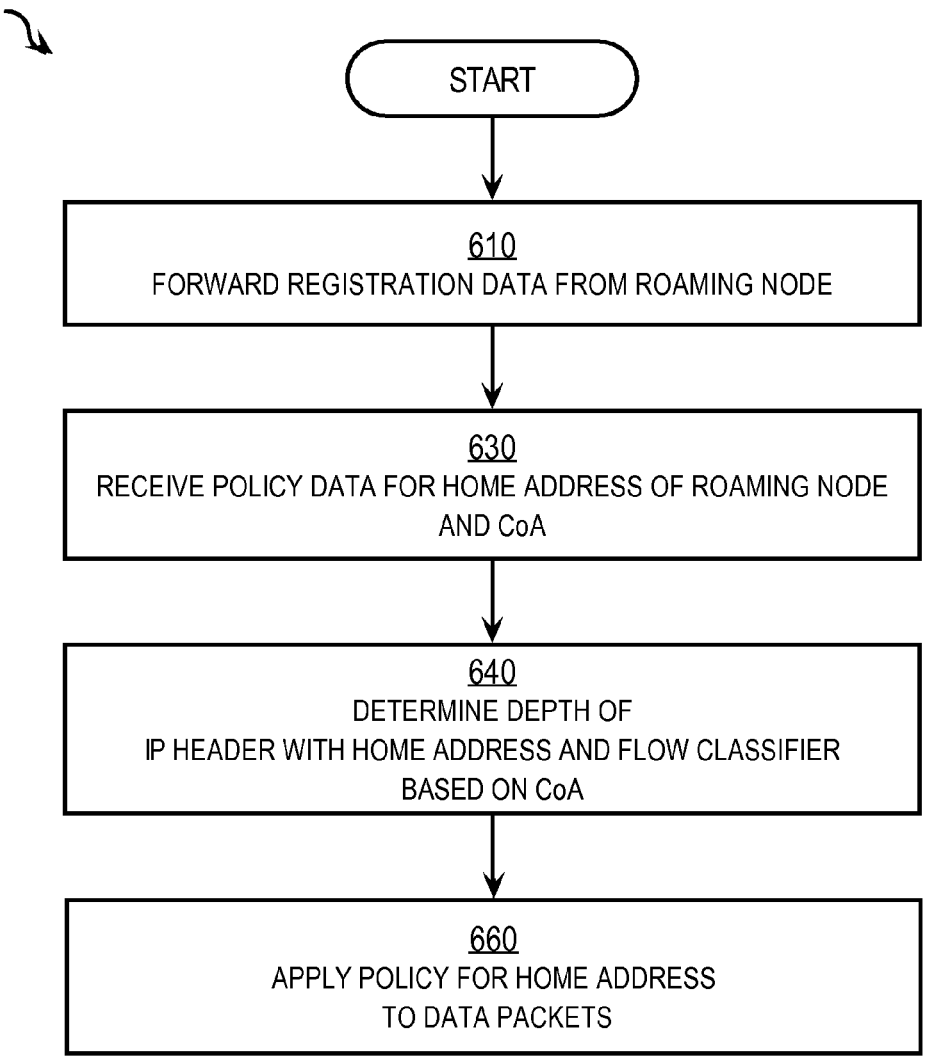

700 METHOD AT HOME BEARER MANAGER IN HOME NETWORK

800 METHOD AT HOME POLICY MANAGER IN HOME NETWORK

POLICY FOR A ROAMING TERMINAL BASED ON A HOME INTERNET PROTOCOL (IP) ADDRESS

BACKGROUND

1. Technical Field

The present description relates to communications with mobile communication devices that roam from a home region of a communications network to a visited region of the same or different communications network.

2. Background

Communications networks are widely known and used in commerce. A network node is a device or computer system connected by communication links in the network. Information is exchanged between network nodes according to one or more of many well known, new or still developing protocols. In this context, a protocol consists of a set of rules defining how the nodes interact with each other based on information sent over the communication links. A protocol-specific process executing on a node receives the information sent according to the protocol and acts based on the received information.

A publicized next generation network architecture for wireless mobile telecommunications networks that uses the widely supported Internet Protocol (IP) is called Advances to Internet Protocol (IP) multimedia subsystem (A-IMS). A-IMS supports the development of a wide range of multimedia services between communications devices, including real-time voice, video and data, over both mobile and fixed devices. The end point of an A-IMS communication is called a terminal, and includes both fixed and mobile computers, telephones, cell phones, and personal digital assistants (PDAs), among others.

As is well known to even the casual user of a mobile terminal, as the mobile terminal is moved from one location to another, the user may leave the area of the user's home wireless network service provider, for whom the user is a subscriber, and enter the area serviced by another wireless network service provider, called the visited network. While in the area of the visited network, the mobile terminal is said to be roaming. Different rates may apply and the subscriber may notice differences in data services provided.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 1 illustrates an example network that applies policy from a home network to data packets from a roaming mobile terminal;

FIG. 2A illustrates an example message sequence for applying policy in a visited network based on a visited network IP address (VoA) for the roaming mobile terminal;

FIG. 3B illustrates an example message sequence for carrying data packets that include the HoA and use a Mobile IP (MIP) tunnel that terminates at the roaming mobile terminal;

FIG. 6A illustrates at a high level an example method at a visitor bearer manager for applying policy based on the HoA;

DESCRIPTION OF EXAMPLE EMBODIMENTS

Figure 2B:
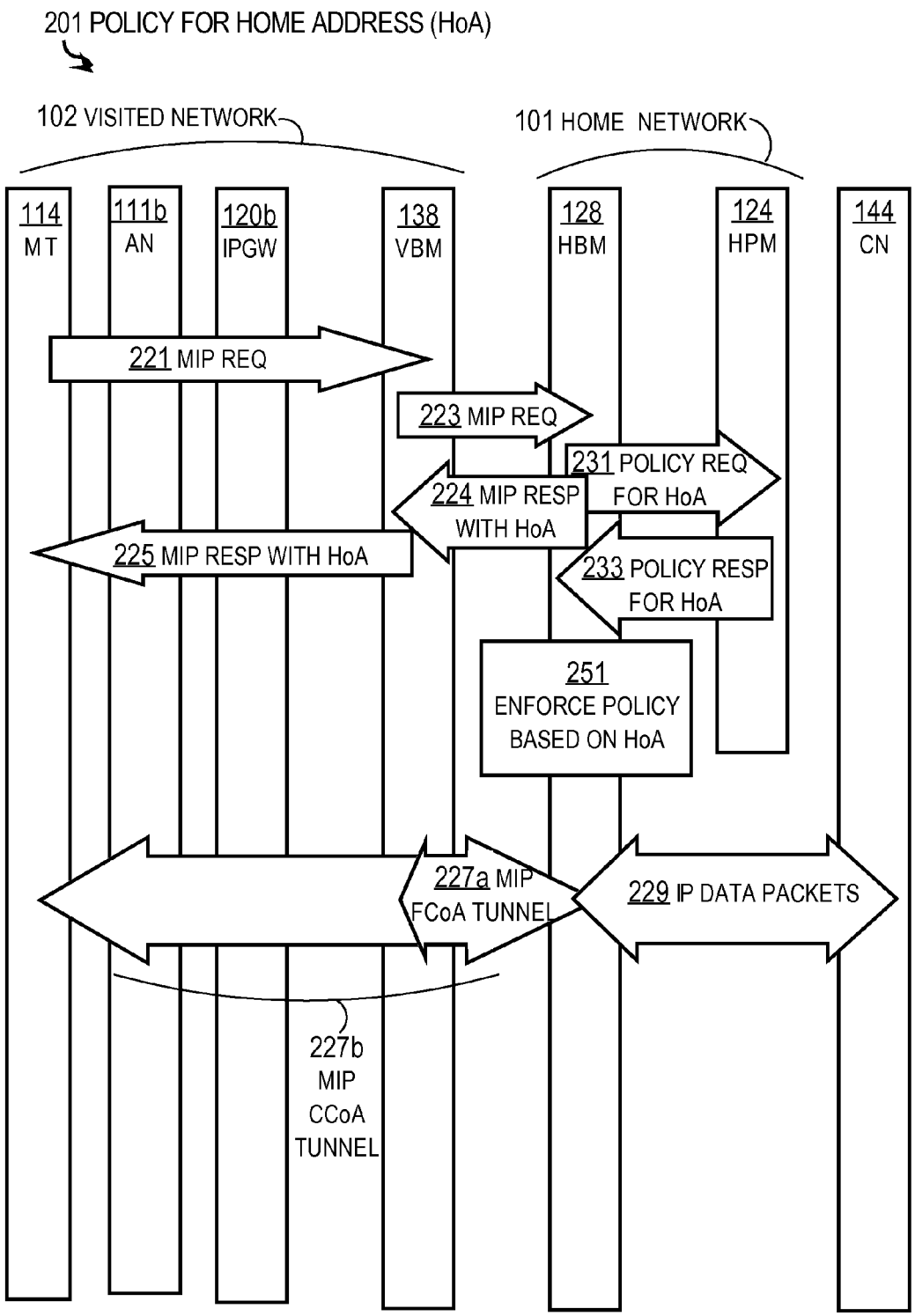
FIG. 2B illustrates an example message sequence for applying policy in a home network based on a home network IP address (HoA) for the roaming mobile terminal.

Techniques are described for applying policy to data packets of a roaming mobile terminal based on a home network IP address. In the following description, for the purposes of explanation, numerous specific details are set forth in order to provide a thorough understanding of the present disclosure. It will be apparent, however, to one skilled in the art that other embodiments may be practiced without these specific details. In other instances, well-known structures and devices are shown in block diagram form in order to avoid unnecessarily obscuring the present disclosure.

Some embodiments are described below in the context of A-IMS service provider networks that utilize both a visited network IP address (VoA) and a home network IP address (HoA) and employs in each network a policy manager that is separate from a data traffic bearer manager and an IP gateway (IPGW). However, other embodiments are not limited to this context and may be used wherever policy for a roaming terminal resides in a home region of a network but is to be applied in a visited region of the same network or a different network. As used herein, the home network refers to the home region of a network where the home bearer manager for a mobile device with a home IP address is located, and the visited network refers to the visited region of the same or different network where a visited bearer manager defines for the same mobile device a visitor IP address that is different from the home IP address. As used herein, roaming refers to the use of a visited network by a mobile device. In some embodiments, the visited and the home network region may furthermore be the same.

1.0 Overview

In one set of embodiments, a method includes receiving, at a node in a visited network, policy for a roaming terminal from a home network of the roaming terminal based on a home Internet Protocol (IP) address of the roaming terminal. The node in the visited network applies the policy in the visited network to data packets that include the home IP address. Applying the policy to a data packet encompasses either enforcing the policy at the node that applies the policy, or sending data that indicates the policy to a different node that applies the policy based on the data sent, or both.

In another set of embodiments, a method includes receiving, at a node of a home network of a terminal, from a visited network, registration data for the terminal while the terminal is roaming in the visited network. The node of the home network sends data that indicates how to apply the policy in the visited network to data packets that include a home Internet Protocol (IP) address of the terminal.

In other embodiments, an apparatus, or system, or logic encoded in one or more tangible media, or a set of instructions encoded on one or more computer-readable media, is configured to perform one or more steps of the above methods.

2.0 Network Overview

FIG. 1 illustrates an example network 100 that applies policy from a home network to data packets in a visited network from a roaming mobile terminal. Network 100 includes a mobile terminal 114 that belongs to a particular subscriber, a home service provider IP network, called home network 101, for the particular subscriber, a visited service provider IP network, called a visited network 102, and a common IP network, such as the Internet 140. In some cases the visited network 102 is operated by the same service provider as the home network 101, but in a different region, e.g., in the western United States instead of the Eastern United States. In some embodiments, the internet 140 is replaced by a private IP network.

For wireless service providers, an IP network is connected to a radio access network (RAN) that includes one or more base station systems (BSSs) that each has at least one antenna. A wireless mobile terminal like mobile terminal 114, such as a cell phone, communicates over a wireless link, such as a radio wave at a particular carrier frequency, through an antenna to a BSS. In the illustrated network 100, RAN 103 is connected to home network 101 and RAN 104 is connected to visited network 102. RAN 103 includes BSS 112a and BSS 112b, connected to antenna 113a and antenna 113b, respectively. RAN 104 includes BSS 112c and BSS 112d, connected to antenna 113c and antenna 113d, respectively. Data packets from a mobile terminal are funneled to an access node in each RAN. RAN 103 includes access node 111a and RAN 104 includes access node 111b.

The service provider IP networks 101 and 102 may use any of several wireless data technologies. The Global System for Mobile Communications (GSM) is a digital cellular technology that is used worldwide, predominantly in Europe and Asia. General Packet Radio Service (GPRS) is a mobile communications technology that enables mobile wireless service providers to offer packet-based data services over GSM networks to their mobile subscribers. CDMA2000 and The Universal Mobile Telecommunication System (UMTS) are protocols of mobile telecommunications standards that use Code Division Multiple Access (CDMA) radio technology, a multiple access scheme for digital radio, to send voice, data, and signaling data between mobile phones and cell sites.

It is assumed for purposes of illustration that mobile terminal 114 is in range of antenna 113d only. Therefore, data from mobile terminal 114 is received at BSS 112d and tunneled to access node 111b in RAN 104 that is connected to visited network 102. In this arrangement, mobile terminal 114 is said to be roaming in visited network 102.

The home network 101 includes an IP gateway (IPGW) 120a, a home services data manager (HSDM) 122, a home policy manager (HPM) 124 and a home bearer manager (HBM) 128. The visited network 102 includes an IP gateway (IPGW) 120b, a visitor services data manager (VSDM) 132, a visitor policy manager (VPM) 134 and a visitor bearer manager (VBM) 138. The home network 101 also includes a VBM, a VPM and a VSDM for roaming terminals, but these are not shown in order to avoid confusion in the example embodiment. Similarly, the visited network 102 includes a HBM, a HPM and a HSDM (not shown) for non-roaming terminals (not shown).

The IP gateway (IPGW), such as IPGW 120a and IPGW 120b, collectively referenced hereinafter as IPGW 120, exchanges traffic for a mobile terminal with the access node (AN) in the RAN, such as access node 111a and access node 111b, respectively, collectively referenced hereinafter as access nodes, AN 111, using IP data packets. In general, data traffic from one or more AN 111 is forwarded to one IPGW 120 in a service provider IP network. In a GPRS network, IPGW 120 corresponds to a Serving GPRS Support Node (SGSN). In a CDMA network, IPGW 120 corresponds to a Packet Data Serving Node (PDSN).

The security information, such as a subscriber identifier, equipment identifier and password, is maintained in the home services data manager, HSDM 122, for subscribers of network 101, such as the particular subscriber who owns mobile terminal 114. Typically, a services data manager (SDM) provides authentications services as well. The policies, such as billing policies, quality of service (QoS) policies, and packet flow optimization (PFO) policies, to be applied to data traffic for the subscribers of home network 101, such as the particular subscriber who owns mobile terminal 114, are maintained in the home policy manager (HPM), e.g., HPM 124. IPGW 120a communicates with HSDM 122 to determine whether to grant data packets from AN 111a access to home network 101. If access is granted, data packets for this session from AN 111a received at IPGW 120a are forwarded to a home bearer manager, e.g., HBM 128. HBM 128 communicates with HPM 124 to determine what policies to apply to data traffic exchanged with IPGW 120a for this session. In general, data traffic for one IPGW is exchanged with several HBM in home network 101, but all home routed traffic for a single terminal goes to the same HBM. An HBM corresponds to a Home Agent (HA) in a CDMA network and a Gateway GPRS Support Node (GGSN) in a GPRS network.

When a RAN is communicating with a roaming terminal, the visited network uses a visitor services data manager, a visitor policy manager and a visitor bearer manager. For example, the security information, such as a subscriber identifier, equipment identifier and password, is maintained in the visitor services data manager, VSDM 132, for subscribers of a different network, such as the particular subscriber who owns mobile terminal 114. The VSDM 132 obtains the security data from the HSDM 122 using security peering messages. The policies, such as billing policies, quality of service (QoS) policies, and packet flow optimization (PFO) policies, to be applied to data traffic for the subscribers of the different network, such as the particular subscriber who owns mobile terminal 114, are maintained in the visitor policy manager (VPM), e.g., VPM 134. The VPM 134 obtains these policies from the HPM 124 using policy peering messages. IPGW 120b communicates with VSDM 132 to determine whether to grant access to data packets from AN 111b to home network 101. If access is granted, data packets from access node 111b received at IPGW 120b are forwarded to a visitor bearer manager, e.g., VBM 138. VBM 138 communicates with VPM 134 which communicates with HPM 124 to determine what policies to apply to data traffic exchanged with IPGW 120b. In general, data traffic for one IPGW is exchanged with several VBM in visited network 102, but all traffic for a single roaming terminal goes to the same VBM. A VBM corresponds to a Home Agent (HA) and, in some scenarios, also a Foreign Agent (FA) in a CDMA network; and to a GGSN in a GPRS network.

In general, a mobile terminal, such as mobile terminal 114, communicates with a corresponding node (CN) 144, which is a process operating on a particular network node. When the mobile terminal 114 is not roaming, it is assigned a home network IP address (HoA) and its data traffic with the CN 144 is passed through the HBM 128. When the mobile terminal is roaming, much of the data traffic for the CN 144 is still passed through the HBM 128, as indicated by the dashed line from the HBM 128 to the CN 144. For such traffic, the VBM 138 obtains the home network IP address (HoA) and forwards IP data packets to and receives IP data packets from the HBM 128. The VBM and HBM are IP peers. Some types of real-time communications, however, such as voice over IP, suffer from the extra latency introduced by the extra hops in going between the VBM 138 and HBM 128. Thus the advances to IP multimedia subsystem (A-IMS) allows the visited network 102 to assign a visited network IP address to the roaming terminal for such traffic and exchange this traffic between the VBM 138 directly with the Internet 140 and CN 144, as indicated by the dashed line from the VBM 138 to the CN 144. However, Session Initiation Protocol (SIP) used to signal the establishment of real-time sessions within an IP network typically uses the HoA and the path through the HBM. There is no SIP peering required between the visited and home networks in this embodiment. There may also be a VBM and VoA assigned for use with low-latency traffic when the mobile terminal is still in the home network. In some of these cases, the VBM and HBM are either the same or located on the same node. In such embodiments, the terminal is always assigned a VoA on a VBM and an HoA on a HBM (and hence applications on the terminal always work the same).

In some embodiments, the CN 144 is a process that terminates the communication. In some embodiments, the CN is a bearer manager in another provider network (not shown) for connection to a fixed or mobile terminal in the other service provider network.

In general, two processes communicate via a network using one or more protocols for network communications. Many terms, such as client, server, module, gateway and manager are conventionally used to refer to the process that provides the service, or the network node on which the process operates. As used herein, these terms refer to the processes, rather than the host nodes, unless otherwise clear from the context. In many embodiments, two or more processes may execute on the same network node.

Although a particular number of service provider networks, radio access networks, base station systems, IP gateways, policy managers, data bearer managers, services data managers, mobile terminals and corresponding nodes are included in FIG. 1 for purposes of illustration; in other embodiments, more service provider networks, radio access networks, base station systems, IP gateways, policy managers, data bearer managers, services data managers, mobile terminals and corresponding nodes are included.

According to some embodiments, described in more detail in a later section, the VBM 138 includes process 151, the HBM 128 includes process 152, the HPM 124 includes process 153 and the VPM 134 includes process 154 so that policy for traffic with a home network IP address (HoA), which is routed through the HBM 128, is enforced at VBM 138 or IPGW 120b in the visited network 102. Before such embodiments are described, however, we show in the next two subsections how policies are currently applied under A-IMS.

2.1 Policy for Visitor Address

FIG. 2A illustrates an example message sequence 200 for applying policy in a visited network based on a visited network IP address (VoA) for the roaming mobile terminal. Such traffic is allowed under A-IMS for applications, such as real time voice and video and gaming data that suffer from high latency paths. In a message sequence diagram, time increases downward. Each time-elongated box indicates a process or node in the network. In FIG. 2A, the messages are passed between the mobile terminal (MT) 114, the access node (AN) 111b, the IPGW 120b, the VBM 138 and the VPM 134 in the visited network 102, as well as the HPM 124 in the home network 101 and the CN 144 in the Internet 140. The HBM is not used.

Each packet sent over a communications network typically comprises 1] header information associated with a particular protocol, and 2] payload information that follows the header information and contains information that may be processed independently of that particular protocol. Often, the data in the payload for the particular protocol includes a header and payload for a different protocol associated with a process operating at one or more nodes. The protocol in a payload of another protocol is said to be encapsulated in the other protocol. A tunnel is a protocol that encapsulates data packets of another protocol. The headers included in a packet traversing multiple heterogeneous networks, such as the Internet and cellular telephone signaling networks, typically include a physical (layer 1) header, a data-link (layer 2) header, an internetwork (layer 3) header and a transport (layer 4) header, as defined by the Open Systems Interconnection (OSI) Reference Model. A protocol header and payload is called a message, frame, datagram, packet or cell; and although the terms are sometimes used to distinguish the portions of different protocols, these terms are used interchangeably herein.

In preliminary messages (not shown) a Point-to-Point Protocol (PPP) tunnel is established between the mobile terminal (MT) 114 and the IPGW 120b, through the access node 111b.

Using Dynamic Host Configuration Protocol (DHCP), a node that first connects to an IP network is provided with configuration data to work with that network, including receiving an IP address. For example, the node first authenticates itself with the network via IPGW 120b, VSDM 132 and HSDM 122 and establishes a PPP tunnel with IPGW 120b. As part of this process, HSDM 122 informs IPGW 120b (via VSDM 132) about the HBM to use. A DHCP client on MT 114 then sends out over the PPP tunnel a DHCP discovery message that reports the unique identifier for the MT 114, such as the Media Access Control (MAC) number of the MT 114. In response, a DHCP server, e.g., a DHCP server on IPGW 120b, dynamically determines a VBM, such as VBM 138, and exchanges message with a Proxy Mobile IP (PMIP) process or a Network-based Localized Mobility Management (NETLMM) process on the VBM which uses PMIP version 6 (PMIPv6). For example, a first message of several PMIP messages 220 is sent to the PMIP process on the VBM 138. The VBM maintains a pool of visited network addresses for roaming terminals. The VBM responds to the DHCP server on the IPGW with a VoA for the roaming MT in a second message of PMIP messages 220. The DHCP server on IPGW includes the VoA in a DHCP offer to the roaming MT. In a final DHCP acceptance message, the roaming MT accepts one of one or more offers for configuration data. In the illustrated embodiment, the DHCP offer/acceptance messages 212 are depicted between the roaming MT 114 and the IPGW 120b through the access node 111b and includes the visited network IP address (VoA) for the mobile terminal. Thus both the MT 114 and the VBM 138 are informed of the VoA for MT 114. The PMIP request messages also indicate to the VBM the subscriber ID associated with the VoA provided.

In order to obtain the policies to associate with the VoA, the VBM contacts the VPM for static polices to apply. Static polices are typically applied to all traffic from a particular address and often are not based on type of traffic. In the illustrated embodiment, VBM 138 sends a policy request message 230 to VPM 134 after a PMIP response is sent in 220; VBM 138 may delay sending such a PMIP response until after the policy response 232 is received. The policy request message 230 includes data that indicates the VoA and subscriber ID and home network 101, such as an IP address of the HPM. In some embodiments the request is sent using an implementation of a DIAMETER protocol called a Ty interface.

In policy peering messages 240, the VPM peers with the HPM to obtain the static policies for the traffic routed based on the VoA. The VPM identifies the HPM based on configuration data on the VPM associated with the subscriber ID information, or by using DIAMETER routing where the VPM just knows an entry point to the home network based on the subscriber identity (e.g., the domain portion of an email address). In some embodiments, the VPM identifies the MT based on the subscriber ID provided by VBM in the Policy Req 230. In various embodiments, the policy is subscriber-specific or the same policy applied to all home subscribers in the visitor network. If subscriber-specific, the subscriber ID and HPM IP address is included in the messages 220, 230 and 240. For example, the HPM informs the VPM that roaming charges do apply for the particular subscriber ID and to meter the amount of traffic or time for the real-time communications.

In policy response message 232 sent from the VPM to the VBM, the policy to apply to traffic for VoA is specified. In process 250, that policy is applied to traffic that arrives at VBM 138 for VoA. In some embodiments, an install message 252 is sent to the IPGW 120b with the VoA and associated static policy; and in process 254, that policy is applied to traffic that arrives at IPGW 120b (and not applied to the same VoA traffic when it arrives at VBM 138).

Data traffic for VoA passes between VBM 138 and the MT 114 in one or more tunnels 226 that cross the IPGW 120b and the AN 111b. Data traffic for VoA passes between the VBM 138 and the CN 144 in IP data packets 229 that are routed by conventional routers. A router is a network node that forwards data packets based on information in an outermost IP header.

Figure 3A:
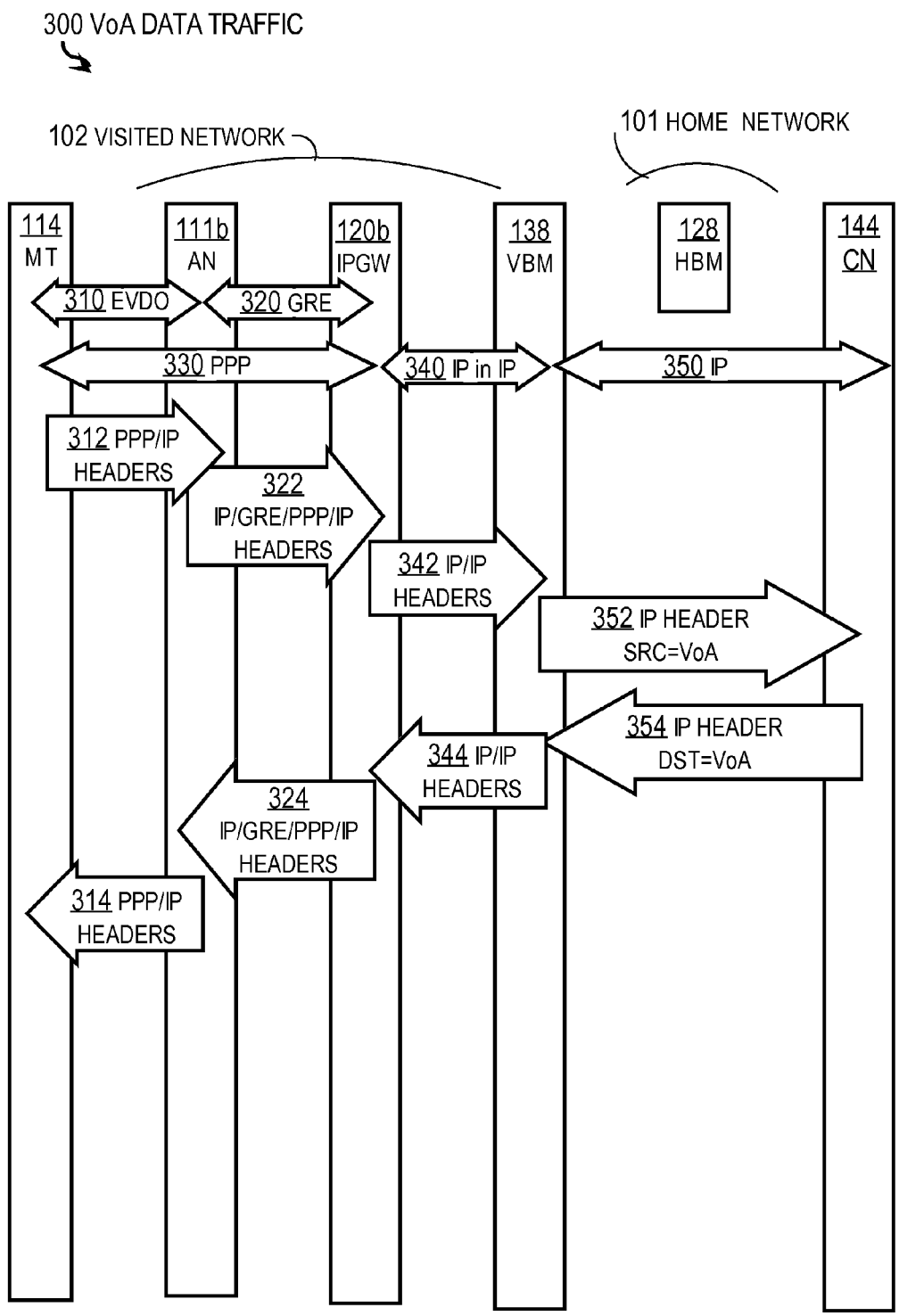
FIG. 3A illustrates an example message sequence for carrying data packets that include the VoA but do not include the HoA.

FIG. 3A illustrates an example message sequence 300 for carrying data packets that include the VoA but do not include an HoA. The data packets are passed between the MT 114, the AN 111b, the IPGW 120b and the VBM 138 in the visited network 102 and the CN 144 in the Internet 140, bypassing the HBM 128 in the home network 101.

An Evolution-Data Only (EVDO) protocol 310 passes packets between the MT 114 and the AN 111b; and a Generic Routing Encapsulation (GRE) tunnel 320 passes data packets between the AN 111b and the IPGW 120b. EVDO is a telecommunications standard for the wireless transmission of data through radio signals, typically for broadband Internet access. GRE is a tunneling protocol that was originally developed by Cisco Systems, Inc of San Jose Calif.; and it can do a few more things than IP-in-IP tunneling. For example, one can also transport multicast traffic and IPv6 through a GRE tunnel. A PPP tunnel 330 transports across the EVDO and GRE tunnels to connect the MT 114 and IPGW 120b.

Traffic is tunneled from the IPGW 120b to the VBM 138 using IP-in-IP tunnel 340 or GRE. An IP-in-IP tunnel encapsulates an IP datagram in the payload of an outer IP header so that an IP data packet can be diverted first to the node indicated in the outer IP header. Traffic from the inner IP data packet is passed between the VBM 138 and CN 144 using standard IP routing, thus bypassing the HBM 128.

For example, a payload from MT 114 for CN 144 is encapsulated in an IP header at the MT 114 and the IP data packet is encapsulated in a PPP header to form data packet 312, as shown in the first line of Table 1, below. The IP header source address is VoA and the IP header destination address is the IP address of CN 144. The PPP data packet 312 is passed in EVDO protocol 310 portion of the PPP tunnel 330 to the AN 111b.

TABLE 1

VoA data traffic packets at legs between MT and CN.

| Data Packet | GRE header | PPP header (tunnel 330) | Outer IP header (tunnel 340) | Inner IP header |
|---|---|---|---|---|
| 312 | No | Yes | No | Src = VoA<br>Dst = CN address |
| 322 | Src = PCF<br>Dst = IPGW | Yes | No | Src = VoA<br>Dst = CN address |
| 342 | No | No | Src = IPGW<br>Dst = VBM | Src = VoA<br>Dst = CN address |
| 352 | No | No | No | Src = VoA<br>Dst = CN address |
| 354 | No | No | No | Src = CN address<br>Dst = VoA |
| 344 | No | No | Src = VBM<br>Dst = IPGW | Src = CN address<br>Dst = VoA |
| 324 | Src = IPGW<br>Dst = PCF | Yes | No | Src = CN address<br>Dst = VoA |
| 314 | No | Yes | No | Src = CN address<br>Dst = VoA |

At the AN 111b, the PPP packet is encapsulated in a GRE header which is encapsulated in another IP header in packet 322 to pass through the GRE tunnel 320 portion of PPP tunnel to IPGW 120b, as shown in the second line of Table 1. The outer IP header has as a destination the IPGW and as a source the IP address of a packet control function (PCF) process that operates on the AN 111b. The PCF routes IP packet data between the mobile station within an antenna cell range and the IPGW, such as the PDSN. The IPGW strips off the outer IP and GRE tunnel headers to obtain the PPP data packet, then strips off the PPP header to recover the inner IP header and original payload. The inner IP header indicates a source address of VoA; and the policy associated with VoA is enforced, if the IPGW is the policy enforcing node (also called the policy enforcer). For example, the amount of data (or time) is incremented to accrue roaming charges. The original IP packet is also encapsulated in an outer IP header in packet 342 to pass through the IP-in-IP tunnel 340 from the IPGW 120b to the VBM 138, as shown in the third line of Table 1. The VBM strips off the outer IP header to recover the inner IP header and original payload. The VBM sends the inner IP header with source VoA and destination of the CN address and the original payload in packet 352, using simple IP 350 so that it is delivered to CN 144 by the best route, thus bypassing the HBM 128. If the VBM enforces the policy, then the policy associated with VoA is enforced by the VBM.

A packet traversing the opposite direction begins at CN 144 as an IP packet 354 with an IP header source of CN 144 address and destination of VoA, as shown in the next line of Table 1, and includes an IP payload for use by a process at the MT 114. The packet 354 arrives at the VBM 138 by simple IP 350 because the VBM advertises to its neighbors that the VBM 138 can reach this VoA (the IPGW 120b does not advertise the VoA to its neighbors). If the VBM enforces policy, then the policy associated with VoA is enforced by the VBM 138. The VBM 138 then encapsulates the original IP header and original payload in an outer IP header of packet 344, with an outer IP destination of IPGW 120b and outer IP source of VBM 138, as shown in the next line of Table 1, to traverse the IP-in-IP tunnel 340 or a GRE tunnel. The IPGW 120b receives packet 344 and strips off the outer IP header. If the IPGW enforces policy, then the policy associated with VoA is enforced by the IPGW 120b. The original IP header and payload is encapsulated in the PPP tunnel to the MT 114, which is encapsulated in the IP/GRE headers of the GRE tunnel 320 from the IPGW 120b to the AN 111b, to form packet 324, as shown in the next line of Table 1. Packet 324 arrives at the AN 111b by virtue of the GRE tunnel with outermost IP header source of IPGW and destination of PCF. At the AN 111b, the outermost IP and GRE headers are stripped off, and packet 314 with only a PPP header encapsulating the original IP header, as shown by the last line in Table 1, is sent to the MT 114. The MT 114 strips off the PPP header and processes the original IP packet with IP header destination of VoA.

2.2 Policy for Home Address

FIG. 2B illustrates an example message sequence for applying policy in a home network based on a home network IP address (HoA) for the roaming mobile terminal. This type of policy enforcement is the current approach for A-IMS. Such HoA traffic is the default under A-IMS for applications, such as email, web browsing, file transfer and SIP signaling packets, which do not require extremely low latency paths. In FIG. 2B, the messages are passed between the mobile terminal (MT) 114, the access node (AN) 111b, the IPGW 120b and the VBM 138 in the visited network 102, as well as the HBM 128 and HPM 124 in the home network 101 and the CN 144 in the Internet 140. Note that, unlike FIG. 2A, the VPM 134 is not involved.

In preliminary messages (not shown) a Point-to-Point Protocol (PPP) tunnel is established between the mobile terminal (MT) 114 and the IPGW 120b, through the access node 111b. In DHCP messages and PMIP messages, as shown in FIG. 2A messages 210, 212 and 220, The MT 114 obtains the VoA for itself.

In a Mobile IP (MIP) request message 221, the MT 114 requests a route back to its home network. This message arrives over the PPP tunnel to the IPGW and is forwarded in an IP-in-IP tunnel to the VBM. In some embodiments, the MIP request in message 221 is for an MIP tunnel that extends between the HBM 128 and the MT 114. In such a request the VoA is included in the MIP request 221 as a Care-of Address (CoA). The CoA that is the same as the VoA is called a Co-located CoA (CCoA). In some embodiments, the MIP request in message 221 is for a MIP tunnel that extends between the HBM and the VBM, the latter acting as a foreign agent (FA) in a CDMA network. In such a MIP request, the VBM address is included in the MIP Request as the CoA. The CoA that is the same as the VBM address is called a Foreign Agent-based CoA (FCoA). In the CCoA case, the MT obtains the CoA as a simple IP address from the visited network before message 221. In the FCoA case, the MT learns the CoA from the Mobile IP Agent Advertisement message from the VBM before message 221. The MT includes the CoA in the Mobile IP Registration Request message. In current approaches, MIP version 4 (MIPv4) can use either a CCoA or a FCoA; but MIP version 6 (MIPv6) must use a CCoA.

The MIP Request message 223 sent from the VBM to the HBM includes data that identifies the MT 114 or the subscriber, the CoA and the VBM address. In the illustrated embodiment, the subscriber-ID is included in the MIP message. For MIPv6, a secure IP (IPSec) protocol tunnel is established which provides the subscriber ID, but it is still possible to include the subscriber ID in the MIPv6 signaling.

When the HBM 128 receives message 223 from VBM 138, the HBM knows the subscriber ID and the associated VBM. The HBM maintains a pool of IP addresses for its subscribers' roaming mobile terminals and determines a particular HoA for the particular MT 114. The HoA is included in a MIP response 224 sent back to the VBM. The VBM sends an MIP response 225 to the MT 114 with the HoA. Thus the MT 114 is informed of its HoA while roaming in the visited network. Traffic to and from HoA in an IP header is routed to and from the MT 114 through the IPGW 120b, the VBM 138 and the HBM 128.

The HBM 128 determines the policy to apply to such traffic by sending a policy request message 231 to the HPM 124. The message 231 includes data that indicates the subscriber ID and the HoA and the IP address of the HBM 128.

In response, the HPM 124 determines one or more policies to apply to traffic for the particular subscriber and sends them back to the HBM 128 in one or more policy response messages 233. The messages 233 include data that indicates these policies (including any flow classifier for packet flow optimization, PFO, policies) and the HoA. In some embodiments, sending of message 224 is delayed to after receipt of message 233—if HBM wants to enforce any HoA policies prior to sending the MIP response 224.

In process 251, the HBM 128 is configured to enforce these policies on data traffic for HoA. That data traffic for HoA traverses between the HBM 128 and CN 144 in simple IP data packets. That data traffic for HoA traverses between the HBM 128 and MT 114 in one or more tunnels, including a MIP tunnel. A MIP FCoA tunnel 227a extends from the HBM 128 to the VBM 138, and further tunnels, e.g., tunnels 226 shown in FIG. 2A, carry the data traffic between the VBM 138 and the MT 114. An MIP CCoA tunnel 227b (such as an IP-in-IP tunnel or GRE tunnel) extends from the HBM 128 to the MT 114 inside zero or more other tunnels.

FIG. 3B illustrates an example message sequence 301 for carrying data packets that include the HoA and use a MIP tunnel that terminates at the roaming mobile terminal. This is a MIP tunnel with a CCoA used by either MIPv4 or MIPv6.

The data packets are passed between the MT 114, the AN 111b, the IPGW 120b and the VBM 138 in the visited network 102 and the HBM 128 in the home network 101 and the CN 144 in the Internet 140.

As described above for FIG. 3A, an EVDO protocol 310 passes packets between the MT 114 and the AN 111b; and a GRE tunnel 320 passes data packets between the AN 111b and the IPGW 120b. Also as described above, a PPP tunnel 330 transports across the EVDO and GRE tunnels to connect the MT 114 and IPGW 120b; and data traffic is tunneled from the IPGW 120b to the VBM 138 using IP-in-IP tunnel 340. A second IP-in-IP tunnel 370 for MIP CCoA transports data traffic across the other tunnels to connect the MT 114 and HBM 128. The outer IP data packet of tunnel 370 is used to pass data traffic between the VBM 138 and HBM 128 using standard IP routing 360 (the VoA address used as the Care-of Address is advertised by the VBM). Simple IP routing 380 based on the inner IP header is used to pass data traffic between the HBM 128 and the CN 144.

For example, a payload from MT 114 for CN 144 is encapsulated in an IP header at the MT 114 and the IP data packet is encapsulated in a second IP header for tunnel 370 and a PPP header for tunnel 330 to form data packet 316, as shown in the first line of Table 2, below. The inner IP header source address is HoA (not VoA, as in message 312 of Table 1) and the IP header destination address is the IP address of CN 144. The second IP header for tunnel 370 adds a column to Table 2 compared to Table 1. The second IP header source address is VoA and the IP destination is the address of HBM 128. The PPP/IP-in-IP data packet 316 is passed in EVDO protocol 310 portion of the PPP tunnel 330 to the AN 111*b*.

Table 2, and an IP payload for use by a process at the MT 114. The packet 387 arrives at the HBM 138 by simple IP 380 because the HBM advertises to its neighbors that the HBM 128 can reach this HoA (the IPGW 120*b* and VBM 138 do not advertise the HoA to their neighbors, however, the VBM does advertise the VoA). The policy associated with HoA is

TABLE 2

HoA data traffic packets at legs between MT and CN for CCoA.

| Data Packet | GRE header | PPP header | Outer IP header (tunnel 340) | Second IP header (tunnel 370) | Inner IP header |
|---|---|---|---|---|---|
| 316 | No | Yes | No | Src = VoA<br>Dst = HBM | Src = HoA<br>Dst = CN address |
| 326 | Src = PCF<br>Dst = IPGW | Yes | No | Src = VoA<br>Dst = HBM | Src = HoA<br>Dst = CN address |
| 346 | No | No | Src = IPGW<br>Dst = VBM | Src = VoA<br>Dst = HBM | Src = HoA<br>Dst = CN address |
| 366 | No | No | No | Src = VoA<br>Dst = HBM | Src = HoA<br>Dst = CN address |
| 386 | No | No | No | No | Src = HoA<br>Dst = CN address |
| 387 | No | No | No | No | Src = CN address<br>Dst = HoA |
| 367 | No | No | No | Src = HBM<br>Dst = VoA | Src = CN address<br>Dst = HoA |
| 347 | No | No | Src = VBM<br>Dst = IPGW | Src = HBM<br>Dst = VoA | Src = CN address<br>Dst = HoA |
| 327 | Src = IPGW<br>Dst = PCF | Yes | No | Src = HBM<br>Dst = VoA | Src = CN address<br>Dst = HoA |
| 317 | No | Yes | No | Src = HBM<br>Dst = VoA | Src = CN address<br>Dst = HoA |

At the AN 111*b*, the PPP packet is encapsulated in a GRE header which is encapsulated in another IP header in packet 326 to pass through the GRE tunnel 320 portion of PPP tunnel to IPGW 120*b*, as shown in the second line of Table 2. The outer IP header has as a destination the IPGW address and as a source the IP address of a packet control function (PCF) process that operates on the AN 111*b*. The IPGW 120*b* strips off the outer IP and GRE tunnel headers to obtain the PPP/IP-in-IP data packet, then strips off the PPP header to recover the second IP header of tunnel 370 that encapsulates the inner IP header and original payload. The second IP header indicates a source address of VoA. If the IPGW is the policy enforcer, then the IPGW enforces the static policy based on the VoA. The IP-in-IP packet is also encapsulated in an outer IP header in packet 346 to pass through the IP-in-IP tunnel 340 from the IPGW 120*b* to the VBM 138, as shown in the third line of Table 2. The VBM strips off the outer IP header to recover the second IP header of tunnel 370 that encapsulates the inner IP header and original payload. If the VBM is the policy enforcer, then the VBM enforces the static policy based on the VoA. The VBM sends the IP-in-IP header with source VoA and destination of the HBM address and the original payload in packet 366, as shown in the next line of Table 2, using simple IP 360 so that it is delivered to HBM 128.

The HBM 128, which terminates the IP-in-IP tunnel 370, strips off the second IP header and processes packet 386. As shown in the next line of Table 2, packet 386 includes the inner IP header with source HoA and destination of the CN address and the original payload. The policy associated with HoA is enforced at the HBM 128. Packet 386 is routed using simple IP 380 so that it is delivered to CN 144 by the best route.

A packet traversing the opposite direction begins at CN 144 as an IP packet 387 with an IP header source of CN 144 address and destination of HoA, as shown in the next line of Table 2, and an IP payload for use by a process at the MT 114. The packet 387 arrives at the HBM 138 by simple IP 380 because the HBM advertises to its neighbors that the HBM 128 can reach this HoA (the IPGW 120*b* and VBM 138 do not advertise the HoA to their neighbors, however, the VBM does advertise the VoA). The policy associated with HoA is enforced at the HBM 128 to the incoming packet 387. The HBM 128 also adds a second IP header for MIP CCoA tunnel 370 that encapsulates the inner IP header and original payload from CN 144 in packet 367. In packet 367, the second IP header has a source of the HBM address and a destination of the VoA address, as shown in the next line of Table 2.

The packet 364 arrives at the VBM 138 by simple IP 360 because the VBM advertises to its neighbors that the VBM 138 can reach this VoA (the IPGW 120*b* does not advertise the VoA to its neighbors). If the VBM enforces policy, then the policy associated with VoA is enforced at the VBM 138. The VBM 138 then encapsulates the second IP header and inner IP header and original payload in an outer IP header of packet 347. Packet 347 has an outer IP header destination of IPGW 120*b* and outer IP header source of VBM 138, as shown in the next line of Table 2, to traverse the IP-in-IP tunnel 340. The IPGW 120*b* receives packet 347 and strips off the outer IP header. If the IPGW enforces policy, then the policy associated with VoA is enforced at the IPGW 120*b*. The MIP CCoA IP-in-IP tunnel headers and payload are encapsulated in the PPP tunnel 330 to the MT 114, which is encapsulated in the IP/GRE headers of the GRE tunnel 320 from the IPGW 120*b* to the AN 111*b*, to form packet 327, as shown in the next line of Table 2. Packet 327 arrives at the AN 111*b* by virtue of the GRE tunnel with outermost IP header source of IPGW and destination of PCF. At the AN 111*b*, the outermost IP and GRE headers are stripped off, and packet 317 with only a PPP header encapsulating the IP-in-IP headers, as shown by the last line in Table 2, is sent to the MT 114. The MT 114 strips off the PPP header and the second IP header because the MT 114 terminates the MIP CCoA IP-in-IP tunnel 370. The MT 114 processes the original IP packet with IP header destination of HoA from CN 144.

Figure 3C:
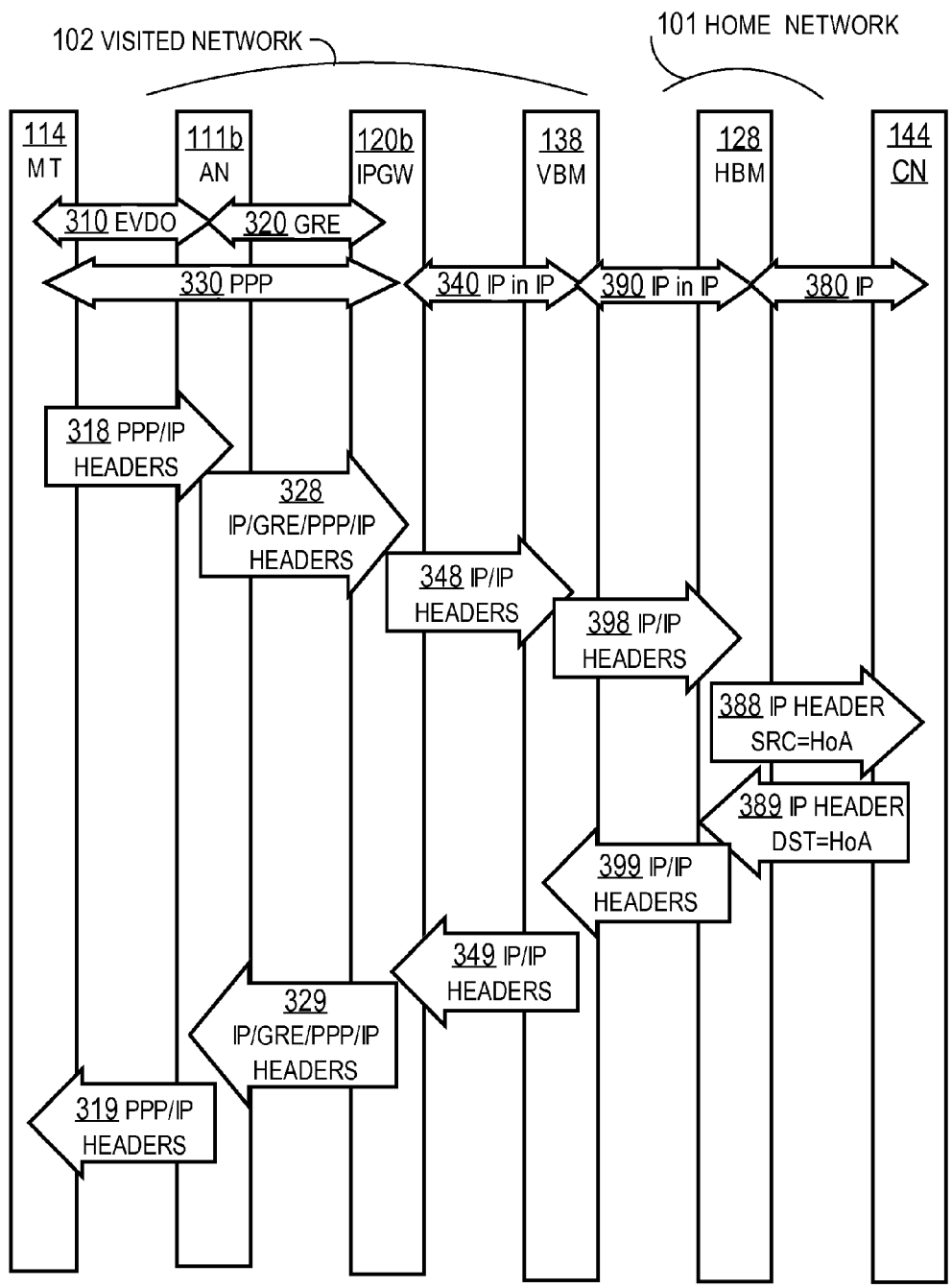
FIG. 3C illustrates an example message sequence for carrying data packets that include the HoA and use a MIP tunnel that terminates at the visitor bearer manager.

FIG. 3C illustrates an example message sequence 302 for carrying data packets that include the HoA and that use a MIP tunnel that terminates at the visitor bearer manager. This is a MIP FCoA tunnel as used sometimes by MIPv4. As in FIG. 3B, the data packets are passed between the MT 114, the AN 111b, the IPGW 120b and the VBM 138 in the visited network 102 and the HBM 128 in the home network 101 and the CN 144 in the Internet 140.

As described above for FIGS. 3A and 3B, an EVDO protocol 310 passes packets between the MT 114 and the AN 111b; and a GRE tunnel 320 passes data packets between the AN 111b and the IPGW 120b. Also as described above, a PPP tunnel 330 transports across the EVDO and GRE tunnels to connect the MT 114 and IPGW 120b; and data traffic is tunneled from the IPGW 120b to the VBM 138 using IP-in-IP tunnel 340. A second IP-in-IP tunnel 390 for MIP FCoA transports data traffic between the VBM 138 and HBM 128. Simple IP routing based on the inner IP header is used to pass data traffic between the HBM 128 and the CN 144. There is no IP-in-IP tunnel 370 from HBM 128 to MT 114.

For example, a payload from MT 114 for CN 144 is encapsulated in an IP header at the MT 114 and the IP data packet is encapsulated in a PPP header for tunnel 330 to form data packet 318, as shown in the first line of Table 3, below. The inner IP header source address is HoA (as in Table 2) and the IP header destination address is the IP address of CN 144. A second IP header for tunnel 390 replaces the second IP header for tunnel 370. The second IP header is not used in packet 318. The PPP/IP data packet 318 is passed in EVDO protocol 310 portion of the PPP tunnel 330 to the AN 111b.

the data packet 348 leaving IPGW 120b. The VBM strips off the outer IP header to recover the inner IP header and original payload. The VBM which terminates the MIP FCoA tunnel 390, forms packet 398 to traverse tunnel 390 with a second IP header that has as a source the IP address of the VBM 138 and as a destination the IP address of HBM 128, as shown in the next line of Table 3. The IP-in-IP packet 398 is routed to HBM 128 based on the IP address of HBM 128.

The HBM 128, which terminates the MIP FCoA IP-in-IP tunnel 390, strips off the second IP header and processes packet 388. As shown in the next line of Table 3, packet 388 includes the inner IP header with source HoA and destination of the CN address and the original payload. The policy associated with HoA is enforced at the HBM 128. Packet 388 is routed using simple IP 380 so that it is delivered to CN 144 by the best route.

A packet traversing the opposite direction begins at CN 144 as an IP packet 389 with an IP header source of CN 144 address and destination of HoA, as shown in the next line of Table 3, and an IP payload for a process at the MT 114. The packet 389 arrives at the HBM 128 by simple IP 380. The policy associated with HoA is enforced at the HBM 128 to the incoming packet 389. The HBM 128 also adds a second IP header for MIP FCoA IP-in-IP tunnel 390 that encapsulates the inner IP header and original payload from CN 144 in packet 399. In packet 399, the second IP header has a source

TABLE 3

HoA data traffic packets at legs between MT and CN for MIP FCoA.

| Data Packet | GRE header | PPP header | Outer IP header (tunnel 340) | Second IP header (tunnel 390) | Inner IP header |
|---|---|---|---|---|---|
| 318 | No | Yes | No | No | Src = HoA<br>Dst = CN address |
| 328 | Src = PCF<br>Dst = IPGW | Yes | No | No | Src = HoA<br>Dst = CN address |
| 348 | No | No | Src = IPGW<br>Dst = VBM | No | Src = HoA<br>Dst = CN address |
| 398 | No | No | No | Src = VBM<br>Dst = HBM | Src = HoA<br>Dst = CN address |
| 388 | No | No | No | No | Src = HoA<br>Dst = CN address |
| 389 | No | No | No | No | Src = CN address<br>Dst = HoA |
| 399 | No | No | No | Src = HBM<br>Dst = VBM | Src = CN address<br>Dst = HoA |
| 349 | No | No | Src = VBM<br>Dst = IPGW | No | Src = CN address<br>Dst = HoA |
| 329 | Src = IPGW<br>Dst = PCF | Yes | No | No | Src = CN address<br>Dst = HoA |
| 319 | No | Yes | No | No | Src = CN address<br>Dst = HoA |

At the AN 111b, the PPP packet is encapsulated in a GRE header which is encapsulated in another IP header in packet 326 to pass through the GRE tunnel 320 portion of PPP tunnel to IPGW 120b, as shown in the second line of Table 3. The outermost IP header for the GRE has as a destination the IPGW address and as a source the IP address of a packet control function (PCF) process that operates on the AN 111b. The IPGW 120b strips off the outer IP and GRE tunnel headers to obtain the PPP/IP data packet, then strips off the PPP header to recover the inner IP header and original payload. The inner IP header and payload is encapsulated in an outer IP header in packet 348 to pass through the IP-in-IP tunnel 340 from the IPGW 120b to the VBM 138, as shown in the third line of Table 3. No IP header indicates a source address of VoA; so a VoA static policy can not be applied to of the HBM address and a destination of the VBM address, as shown in the next line of Table 3.

The packet 399 arrives at the VBM 138 by virtue of the IP address of the VBM 138 in the second IP header for tunnel 390. The VBM cannot enforce policy because the arriving data packet does not include a VoA. The VBM 138, as a termination of MIP FCoA IP-in-IP tunnel 390, strips off the second IP header. As a termination of the IP-in-IP tunnel 340, the VBM encapsulates the inner IP header and original payload in an outer IP header of packet 349. Packet 349 has an outer IP header destination of IPGW 120b address and outer IP header source of VBM 138 address, as shown in the next line of Table 3. The IPGW 120b receives packet 349 and strips off the outer IP header. The inner IP header and payload are encapsulated in the PPP tunnel 330 to the MT 114, which is encapsulated in the IP/GRE headers of the GRE tunnel 320 from the IPGW 120b to the AN 111b, to form packet 329, as shown in the next line of Table 3. Packet 329 arrives at the AN 111b by virtue of the GRE tunnel with outermost IP header source of IPGW and destination of PCF. At the AN 111b, the outermost IP and GRE headers are stripped off, and packet 319 with only a PPP header encapsulating the inner IP header, as shown by the last line in Table 3, is sent to the MT 114. The MT 114 strips off the PPP header and processes the original IP packet with IP header destination of HoA from CN 144 and the original payload.

3.0 Enforcing in Visited Network Policy Associated with Home Network IP Address

The inventors recognized that because all data traffic including an HoA in an IP header passes through both the IPGW 120b and the VBM 138 (as illustrated in FIG. 3B and FIG. 3C), there is an opportunity to apply policies associated with the HoA in the visited network instead of only at the HBM 128 in the home network. The inventors also recognized that such enforcement is desirable in at least some circumstances. For example, it may be desirable to apply polices for SIP signaling that matches the policies for the real time traffic that will be sent over a SIP session. Yet SIP signaling uses HoA not VoA at the MT 114, while the real time data traffic uses VoA. If it is desirable to give SIP signaling traffic the same QoS as the real-time data traffic, it is desirable to enforce this policy in the visited network as well as the home network. Furthermore, the SIP signaling QoS may be different for different subscribers, thus a per-user control of HoA traffic is desirable in the visited network (e.g., at the IPGW/VBM). Furthermore, the SIP signaling QoS may be different for different types of sessions or with different corresponding nodes, thus a per-flow control of HoA traffic is desirable in the visited network (e.g., at the IPGW/VBM). A flow is a set of data packets between the same end processes and is often defined by a 5-tuple comprising a source and destination IP address in an IP header, a type of transport protocol encapsulated in the IP payload, and a source port and destination port in the transport protocol that indicates the processes sending and receiving the data packet on the nodes indicated by the IP addresses. In general, the inventors realized there is an advantage to being able to enforce, in a node of the visited network, policy associated with a HoA for a roaming terminal.

The inventors also noted some problems with attempting to enforce HoA policy in the visited network under A-IMS. A-IMS relies only on VoA policies for enforcement on the VBM/IPGW and does not allow for HoA policy enforcement at the VBM/IPGW. The VoA policy is always static and does not allow for different policies for different flows. Furthermore, the IP header that includes the HoA that is associated with the policy to be applied, and the per flow definitions (called flow classifiers) occur at different depths within the data packet for MIP FCoA and MIP CCoA tunnels at the IPGW and in packets received at the VBM for the IPGW. For example, in FIG. 3B and Table 2, the packet 346 sent by the IPGW in a MIP CCoA tunnel and the packet 347 received include the HoA in a third deepest IP header. In contrast, as shown in FIG. 3C and Table 3, the packet 348 sent by the IPGW outside the MIP FCoA tunnel and the packet 349 received include the HoA in a second-deepest IP header.

In the following description, a detailed approach is presented to modify A-IMS processes to enforce HoA per user and per flow policy at nodes in the visited network. This is one embodiment. In other embodiments, the home and visited networks follow different network architecture from A-IMS; and different processes are modified to allow policies associated with a home network address to be enforced in a visited network.

3.1 System

Figure 4:
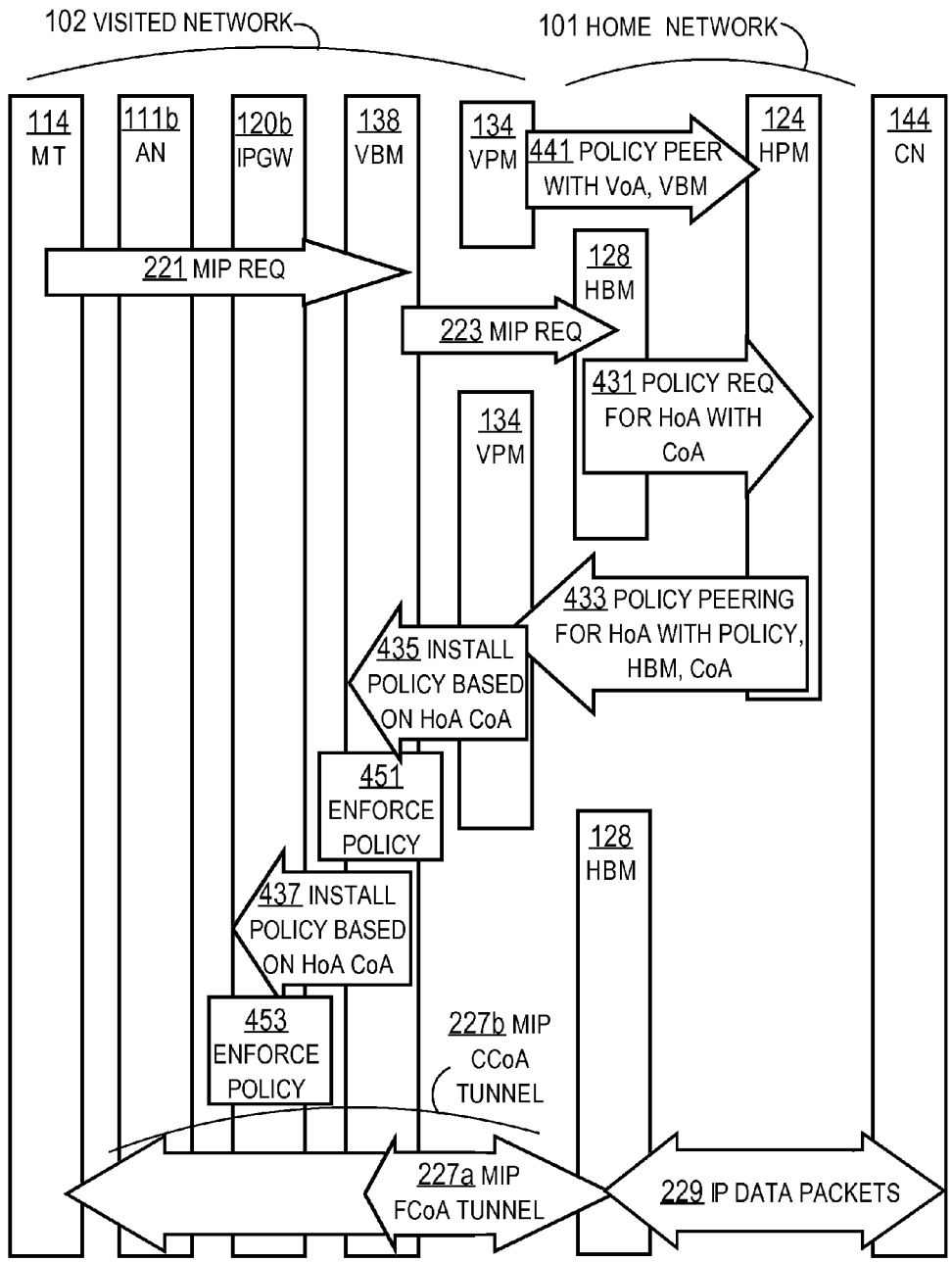
FIG. 4 illustrates an example message sequence for applying policy in a visited network based on the HoA for the roaming mobile terminal.

In one embodiment, a system comprising several processes on multiple nodes sending multiple messages enforces HoA policies at a node in the visited network. FIG. 4 illustrates an example message sequence 400 for applying policy in a visited network based on the HoA for the roaming mobile terminal. In FIG. 4, the messages are passed between the CN 144 in the Internet 140, the mobile terminal (MT) 114, the access node (AN) 111b, the IPGW 120b, and modified versions of the VBM 138 and the VPM 134 in the visited network 102, as well as modified versions of the HBM 128 and HPM 124 in the home network 101. Note that, unlike FIG. 2B, the VPM 134 is involved.

In preliminary messages (not shown) a PPP tunnel is established between the MT 114 and the IPGW 120b, through the AN 111b. In DHCP messages and PMIP messages, as shown in FIG. 2A messages 210, 212 and 220, the MT 114 obtains the VoA for itself.

As shown in FIG. 2A, this VoA is used to register with the VPM 134 through VBM 138. The VPM obtains VoA policy from the HPM 124 in policy peering messages 240. Thus the HPM 124 associates a VoA with a particular VPM 134 of multiple VPM in visited network 102. According to some embodiments, a policy peering message 441 sent from the VPM to the HPM also includes an identifier of the VBM, such as the IP address of the VBM, that passes traffic for the VoA. Thus the HPM 124 associates a particular VPM 134 and VBM 138 with a particular VoA. This association is useful when a subscriber registers multiple mobile terminals with the same visited network, which may engage with different visitor bearer managers that employ different visitor policy managers, as described in more detail below.

In a MIP request message 221, the MT 114 requests a route back to its home network. This message arrives over the PPP tunnel to the IPGW and is forwarded in an IP-in-IP tunnel to the VBM. In MIP CCoA embodiments, the MIP request in message 221 is for an MIP tunnel that extends between the HBM 128 and the MT 114. In such a request the VoA is included in the MIP request 221 as a CCoA. In MIP FCoA embodiments, the CoA field is advertised by VBM to the MT, and then the MIP request in message 221 is for a MIP tunnel that extends between the HBM and the VBM. In such a MIP FCoA request, the source IP address is 0.0.0.0 and the CoA field is filled in by the value advertised by the VBM.

As in FIG. 2B, the MIP Request message 223 sent from the VBM to the HBM includes data that identifies the subscriber ID, the CoA, and the VBM address. When the HBM 128 receives message 223 from VBM 138, the HBM knows the subscriber and the associated VBM. The HBM maintains a pool of IP addresses for roaming mobile terminals that belong to home subscribers and determines a particular HoA for the particular MT 114. The HoA is included in a MIP response (not shown, but like response 224 and 225 in FIG. 2B) sent back to the MT 114 through the VBM. Thus the MT 114 is informed of its HoA while roaming in the visited network. Data traffic to and from HoA in an IP header is routed to and from the MT 114 through the IPGW 120b, the VBM 138 and the HBM 128.

The HBM 128 determines the policy to apply to such traffic by sending a policy request message 431 to the HPM 124. To apply this policy in the visited network, the HBM 128 causes this policy to be promulgated to the visited network by the HPM 134. In the illustrated embodiment, the HBM 128 includes additional information in the policy request message 431 that is not included in the current policy request message (e.g., message 231 in FIG. 2B). The message 431 includes not only data that indicates the subscriber ID, the HoA and the IP address of the HBM 128, as sent in message 231, but also the CoA. Recall that the CoA is equal to the VoA for MIP CCoA and equal to the VBM address for MIP FCoA.

In response, the HPM 124 determines the policies to apply to traffic for the subscriber who owns MT 114. According to the illustrated embodiment, the HPM also determines which policies are to be enforced in the visited network. For the policies to be enforced in the home network, the VPM 124 sends them back to the HBM 128 in policy response message (not shown, but like message 233 in FIG. 2B). The message 233 includes data that indicates these policies (including any flow classifier PFO policies) and the HoA.

For policies to be applied in the visited network, the HPM 124 first determines, based on the CoA, which VPM is to receive the policy information. Recall that as a result of message 441, the HPM 124 associates both a VBM and a VoA with a particular VPM 134. Thus the CoA is associated with a particular VPM 134 at the HPM 124.

For the policies to be enforced in the visited network, the HPM 124 sends to the VPM 134 a policy peering message 433. The policy peering message 433 includes data that indicates these policies (including any flow classifier for PFO policies), that indicates the policies are for MIP data traffic, and that indicates the HoA in an HoA classifier, and the addresses of the HBM 128 and the CoA. If available, the message includes the VBM address as well. When the MIP binding information changes, the HPM 124 updates all the installed policies affected by the change. For example, the HPM notifies some VPM that are no longer involved to uninstall certain policies, and notifies new VPM to install policies, and notifies some VPM that the CoA has changed for some policies.

Based on the CoA indicated in the message 433, the VPM determines which VBM passes traffic for the given HoA. If the VBM address was included in message 433, then the VPM can simply use this address. The VPM applies the policy by sending one or more install messages 435 to install the policy on the VBM so determined. The install messages 435 include data that indicates the policies, that indicates the policies are for a MIP tunnel, and that indicates the particular CoA and HBM addresses for the MIP tunnel.

In process 451, the VBM 138 is configured to apply these policies on data traffic for HoA. In process 451 the VBM determines the depth of the IP header that includes the HoA based on the CoA; and determines a flow classifier based on that depth. Process 451 is described in more detail below with reference to FIG. 5A and FIG. 5B.

The VBM applies the policy by enforcing them itself or sending messages to install one or more policies on the IPGW. In an illustrated embodiment, process 451 includes installing one or more of the policies on the IPGW. The VBM applies the policy by sending one or more install messages 437 to install the policy on the IPGW. The install messages 437 include data that indicates the policies and the properly deep flow classifier determined in process 451. In process 453, the IPGW enforces the policy using the classifier obtained from the VBM.

The data traffic for HoA traverses between the HBM 128 and MT 114 in one or more tunnels, including a MIP CCoA tunnel in some embodiments. A MIP FCoA tunnel 227a extends from the HBM 128 to the VBM 138, and further tunnels, e.g., tunnels 226 shown in FIG. 2A, carry the data traffic between the VBM 138 and the MT 114. A MIP CCoA tunnel 227b extends from the HBM 128 to the MT 114 inside zero or more other tunnels.

Either one or both of the IPGW 120b and the VBM 138 enforces policy for the HoA based on a flow classifier that identifies the correct IP header where the HoA is indicated, as determined in process 451.

It is assumed for purposes of illustration that an MT 114 with MAC identifier MAC1 belongs to subscriber Alice of service provider ISPA of home network 101. When MAC1 registers with visited network 102, it is assigned a VoA=VIP1 by visitor bearer manager with IP address VBM1 (e.g., VBM 138). VBM 138 contacts visitor policy manager with IP address VPM1 (e.g., VPM 134). VPM 134 performs policy peering with a home policy manager HPM (e.g., HPM 124). As a result of this peering, the HPM associates the information displayed in Table 4.

TABLE 4

Example VoA information associated at home policy manager

| Subscriber | VoA | VPM | VBM |
|---|---|---|---|
| Alice | VIP1 | VPM1 | VBM1 |

When the MIP registration is complete, the MT 114 is assigned a HoA=HIP1 by home bearer manager with IP address HBM1 (e.g., HBM 128). HBM 128 contacts the HPM to obtain a policy and informs HPM of the subscriber ID, HoA and, according to the illustrated embodiment, CoA. For MIP FCoA, the CoA is the address of the VBM1. As a result of MIP registration the HPM associates the information displayed in Table 5.

TABLE 5

Example MIP FCoA information associated at home policy manager

| Subscriber | HoA | CoA |
|---|---|---|
| Alice | HIP1 | VBM1 |

Even without the VBM column in Table 4, the line in Table 5 can be associated with the line in Table 4 at the HPM by virtue of the value "Alice" in the subscriber column. Polices for HIP1 can be sent to VPM1.

However, if the subscriber has a second device roaming in the same visited network, ambiguity can arise as to which of several VPM in the visited network should receive the policies for each mobile terminal. It is assumed for purposes of illustration that a second mobile terminal with MAC identifier MAC2 belongs to subscriber Alice. When MAC2 also registers with visited network 102, it is assigned a VoA=VIP2 by visitor bearer manager with IP address VBM2 (e.g., different from VBM 138). The different VBM contacts visitor policy manager with IP address VPM2 (e.g., different from VPM 134). The different VPM performs policy peering with a home policy manager HPM (e.g., HPM 124). As a result of this peering, the HPM associates the information displayed in Table 6.

TABLE 6

Further example VoA information associated at home policy manager

| Subscriber | VoA | VPM | VBM |
|---|---|---|---|
| Alice | VIP1 | VPM1 | VBM1 |
| Alice | VIP2 | VPM2 | VBM2 |

When the MIP registration is complete, the second mobile terminal is assigned a HoA HIP2 by home bearer manager with IP address HBM2 (e.g., different from HBM 128). The different HBM contacts the HPM to obtain a policy and informs HBM of the subscriber ID, HoA and, according to the illustrated embodiment, CoA. For MIP CCoA, the CoA is the address that was assigned by the VBM2, e.g., VIP2. As a result of MIP CCoA registration, the HPM associates the information displayed in Table 7.

TABLE 7

Example MIP CCoA information associated at home policy manager

| Subscriber | HoA | CoA |
|---|---|---|
| Alice | HIP2 | VIP2 |

Even without the VBM column in Table 6, the line in Table 7 is associated with the second line in Table 6 at the HPM by virtue of the value "VIP2" in the VoA column. Polices for HIP2 can be sent to VPM2. However, if the MIP registration is for MIP FCoA, then the CoA is the address of VBM2, as shown in Table 8.

TABLE 8

Further example MIP FCoA information associated at home policy manager

| Subscriber | HoA | CoA |
|---|---|---|
| Alice | HIP2 | VBM2 |

Without the VBM column in Table 6, the line in Table 8 can not be associated with the second line in Table 6 at the HPM. Polices for HIP2 can not be sent to VPM2 only. Policies might have to be sent to both VPM1 and VPM2, wasting valuable resources on VPM1. However, by including the VBM association with the VPM at the HPM, according to some embodiments, the line in Table 8 can be associated uniquely with the second line in Table 6 at the HPM by virtue of the value VBM2 in that column for the second line.

3.2 Methods

Figure 5A:
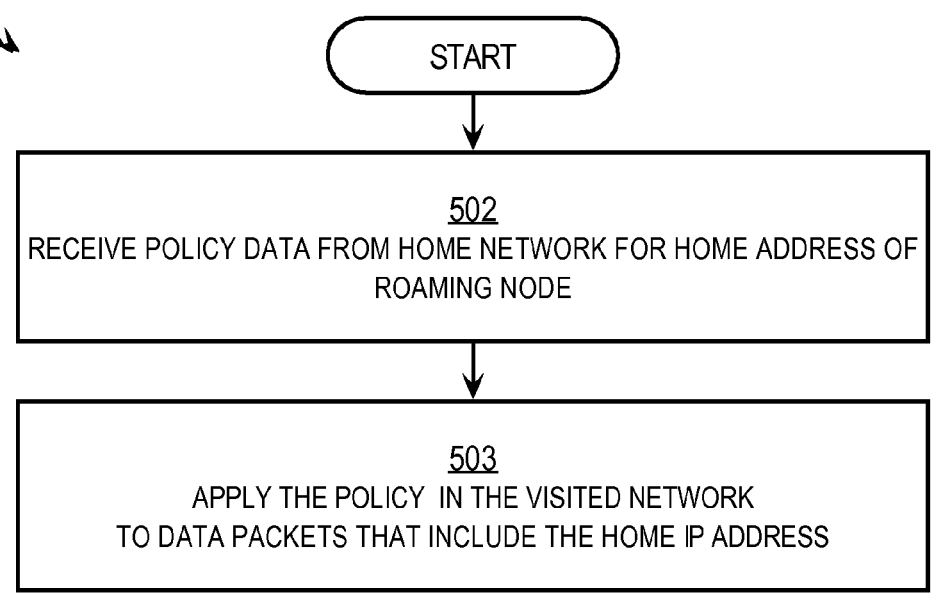
FIG. 5A illustrates at a high level an example method at a visited network node for applying policy in a visited network based on the HoA.

FIG. 5A illustrates at a high level an example method 501 at a visited network node for applying policy in a visited network based on the HoA. Although steps in FIG. 5A and subsequent flow charts, FIG. 5B, FIG. 6A, FIG. 6B, FIG. 7, FIG. 8 and FIG. 9, are shown in a particular order for purposes of illustration, in other embodiments, one or more steps may be performed in a different order or overlapping in time, in series or in parallel, or one or more steps may be omitted or added, or changed in some combination of ways.

In step 502 policy data is received at a node in the visited network. The policy is received ultimately from the home network for a home IP address of the roaming node (such as the mobile terminal 114). Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, directly or indirectly through a different node, or the data is received using some combination of these methods. In an illustrated embodiment, the policy is received from the home policy manager either directly, as at the visitor policy manager, or indirectly, through the visitor policy manager, at the visitor bearer manager or IP gateway.

In step 503, the visited network node that received the policy data applies the policy in the visited network to data packets that include the home IP address. In some embodiments, the node that receives the policy data enforces the policy, such as a visitor bearer manager or an IP gateway. In some embodiments, the node that receives the policy data sends one or more messages that cause another node in the visited network to enforce the policy. For example, a visitor bearer manager applies the policy by sending a policy install message to an IP gateway to enforce the policy, or a visitor policy manager applies the policy by sending a policy install message to a visitor bearer manager to apply the policy by enforcing the policy itself or by sending one or more policy install messages to an IPGW.

Figure 5B:
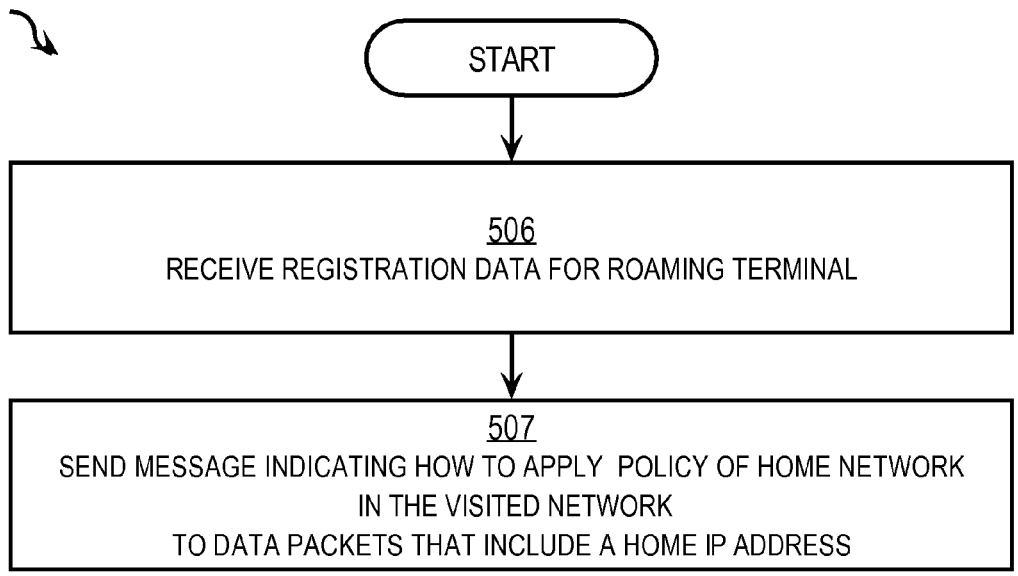
FIG. 5B illustrates at a high level an example method at a home network node for applying policy in a visited network based on the HoA.

FIG. 5B illustrates at a high level an example method 505 at a home network node for applying policy in a visited network based on the HoA. In step 506 registration data for a roaming node is received at a node in the home network. The registration data is received ultimately from the visited network. Any method may be used to receive this data, as described above. In an illustrated embodiment, the registration data is received from the visitor bearer manager either directly, as at the home bearer manager, or directly from the visitor policy manger at the home policy manger, or indirectly at the home policy manager from the visitor bearer manger through the home bearer manager.

In step 507, the home network node that received the registration data sends messages to the visited network on how to apply a policy in the visited network to data packets that include a home IP address for the roaming node. In some embodiments, the node that receives the registration data sends policy data directly to a node in the visited network that applies the policy. For example, a home policy manager sends a message to a visitor policy manager that applies the policy by sending install messages to a visitor bearer manager in the visited network. In some embodiments, the node that receives the registration data sends the data to the visited network indirectly, by sending one or more messages to another node in the home network, which other node sends policy data to a node in the visited network that applies the policy. For example, a home bearer manager sends a message to a home policy manager that sends a message to the visitor policy manager that applies the policy in the visited network.

FIG. 6A illustrates at a high level an example method 600 at a visitor bearer manager (such as VBM 138) for applying policy based on the HoA. Method 600 is one embodiment of method 501 and is depicted in FIG. 1 as process 151 on VBM 138. Step 502 of method 501 includes step 610 and step 630 of method 600.

In step 610, registration from a roaming node is forwarded by the VBM 138 to the home network, either directly or indirectly. For example after a PMIP request message 220 for a VoA, the VoA is forwarded in a policy request message 230 to a VPM 134 that peers with a HPM 124 to obtain a VoA policy. After a MIP request message 221 from the roaming MT 114, MIP request message 223 is sent to the HBM 128 in the home network with registration data. The HBM 128 determines the HoA and sends a policy request message 231 to the HPM 124 to obtain the policies for HoA to be applied in the visited network. Step 610 includes receiving an HoA in a MIP response message 224 and forwarding the HoA to the MT 114 in MIP response message 225. The described actions in step 610 are performed by a VBM according to the current A-IMS standards.

In step 630, in response to step 610, the VBM receives policy data to be applied to data traffic for the roaming terminal that includes the HoA, and the VBM receives data indicating the CoA and HBM addresses for a MIP tunnel. For example, VBM 138 receives from VPM 134 install policy message 435 that includes data that indicates HoA used in MIP traffic, the policy to be applied and the CoA and HBM addresses of the MIP tunnel. The VPM 134 is able to send this install message because the registration data forwarded in step 610 found its way with the proper associations to the HPM 124, which exchanged policy peering message 433 with the VPM 134. This process is described below in more detail with reference to FIG. 8.

Step 503 of method 501 includes step 640 and step 660 of method 600. In step 640, the VBM determines the depth of the IP header with the home address and flow classifier based on the CoA. For example, the VBM 138 determines that the IP header with HoA is the second deepest IP header for MIP FCoA, if the CoA is equal to the IP address of the VBM 138. If not, then the VBM 138 determines that the IP header with HoA is the third deepest IP header for MIP CCoA. These steps are shown in more detail below with reference to FIG. 6B.

In step 660, the VBM applies the policy to data packets with HoA in the IP header of the determined depth. In some embodiments, the VBM 138 enforces the policy. In the illustrated embodiment, the VBM 138 sends an install message 437 to the IP gateway (e.g., IPGW 120b). The install message 437 indicates the policy to be applied for MIP data packets, including the depth of the flow classifier, and the depth of the IP header with the HoA. In such embodiments, the IPGW enforces the policy on data packets sent between the IPGW 120b and the VBM 138.

Figure 6B:
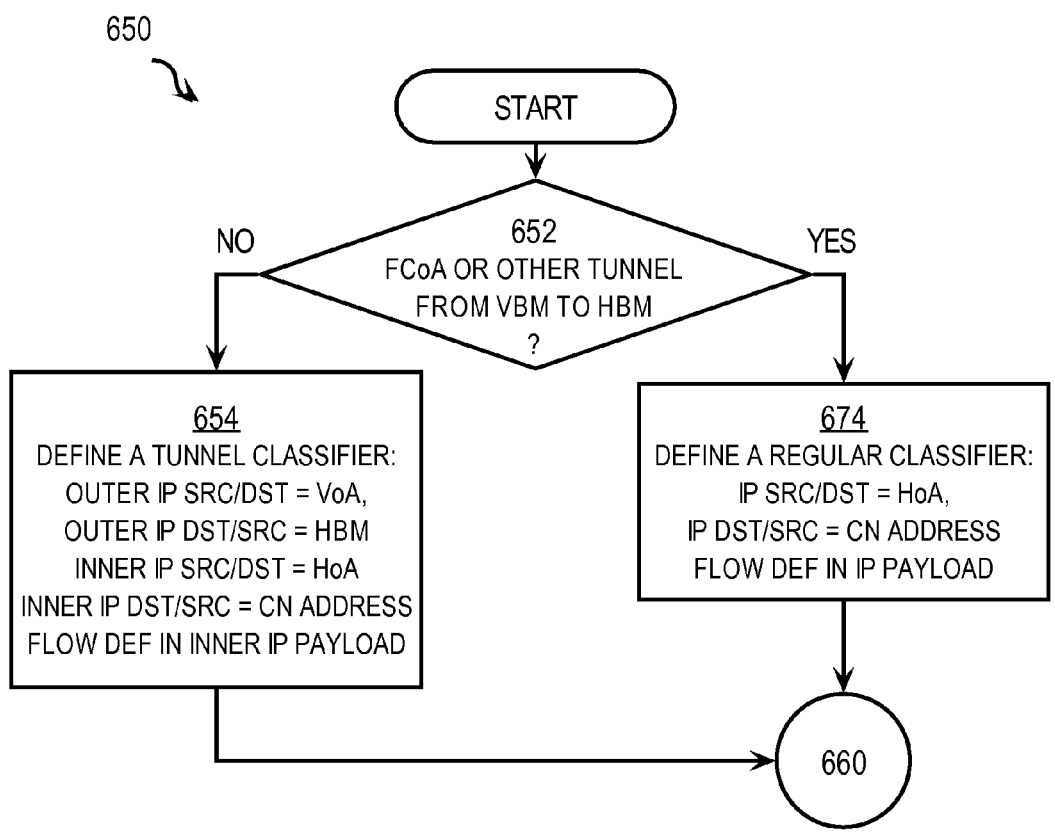
FIG. 6B illustrates an example method for performing a step of the method of FIG. 6A.

FIG. 6B illustrates an example method 650 for performing a step 640 of the method 600 of FIG. 6A. Method 650 is one embodiment of step 640. In step 652 it is determined whether the VBM operates as the FCoA. The VBM knows when it is the foreign agent, and also can determine that the CoA is the IP address of the VBM itself, when the VBM operates as the FCoA.

If it is determined in step 652 that the VBM is not operating as the FCoA, based on the CoA being different from an IP address for the VBM, then control passes to step 654. When control passes to step 654, the IP header with the HoA is encapsulated in the MIP CCoA tunnel having a second IP header (inside an outer IP header for the tunnel from the IPGW to the VBM). In step 654, a tunneled classifier with two IP headers is defined in which the outer IP header of the two has one of the IP source and IP destination equal to the VoA and the other equal to the address of the HBM. The tunneled classifier definition includes the inner IP header in which one of the IP source and IP destination is equal to the HoA and the other is equal to the address of the corresponding node CN 144. The transport protocol type and port numbers, and any other attributes that define a flow, are in the inner IP header or its payload. Control then passes to step 660.

If it is determined in step 652 that the VBM operates as the FCoA, based on the CoA being the same as an IP address for the VBM, then control passes to step 674. When control passes to step 674, the IP header with the HoA is not encapsulated in the MIP CCoA tunnel IP header (but is inside an outer IP header for the tunnel from the IPGW to the VBM). In step 674, a regular classifier with one IP header is defined in which one of the IP source and IP destination is equal to the HoA and the other is equal to the address of the corresponding node CN 144. The transport protocol type and port numbers, and any other attributes that define a flow, are in the inner IP header or its payload. Control then passes to step 660.

Figure 7:
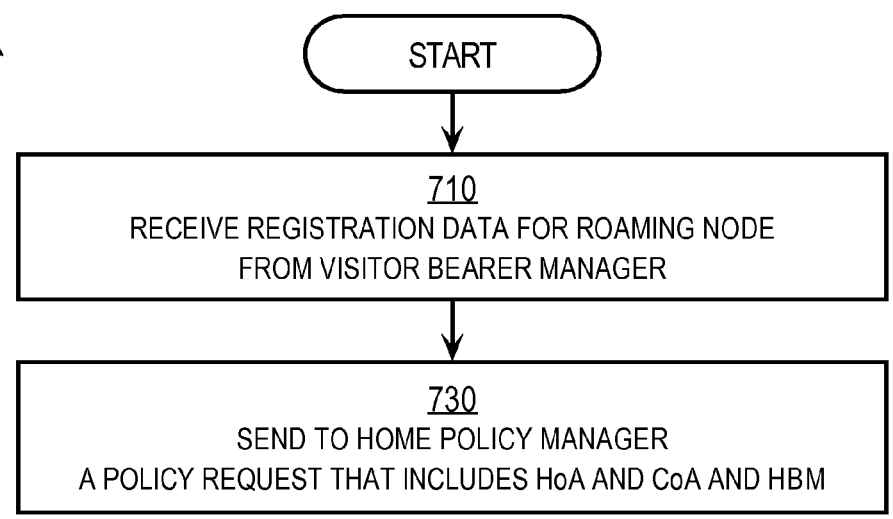
FIG. 7 illustrates at a high level an example method at a home bearer manager for applying policy in a visited network based on the HoA.

FIG. 7 illustrates at a high level an example method 700 at a home bearer manager for applying policy in a visited network based on the HoA. Method 700 is one embodiment of method 505 and is depicted in FIG. 1 as process 152 on HBM 128. In this embodiment, step 506 of method 505 includes step 710 and step 507 of method 505 includes step 730.

In step 710, the home bearer manager receives registration data for a roaming node from a visitor bearer manager. For example, HBM 128 receives MIP request message 223 from VBM 138, as depicted in FIG. 4. The message 223 indicates the subscriber of the roaming terminal and the CoA of the MIP tunnel being requested. For purposes of illustration, it is assumed that the subscriber is Alice, and the CoA is the CCoA of VIP1.

In step 730, the home bearer manager sends to the home policy manager a policy request that includes data that indicates the HoA and the CoA. For example, during step 730, the HBM 128 determines the HoA for subscriber Alice is equal to HIP1. During step 730, HBM 128 sends message 431 to HPM 124 to request policies. The message 431 includes the subscriber identifier and HoA, according to the current A-IMS architecture, and also CoA, according to the illustrated embodiments as well as the address of the HBM itself. Thus message 431 holds data that indicates subscriber=Alice, HoA=HIP1 and CoA=VIP1 and HBM=HBM1.

Figure 8:
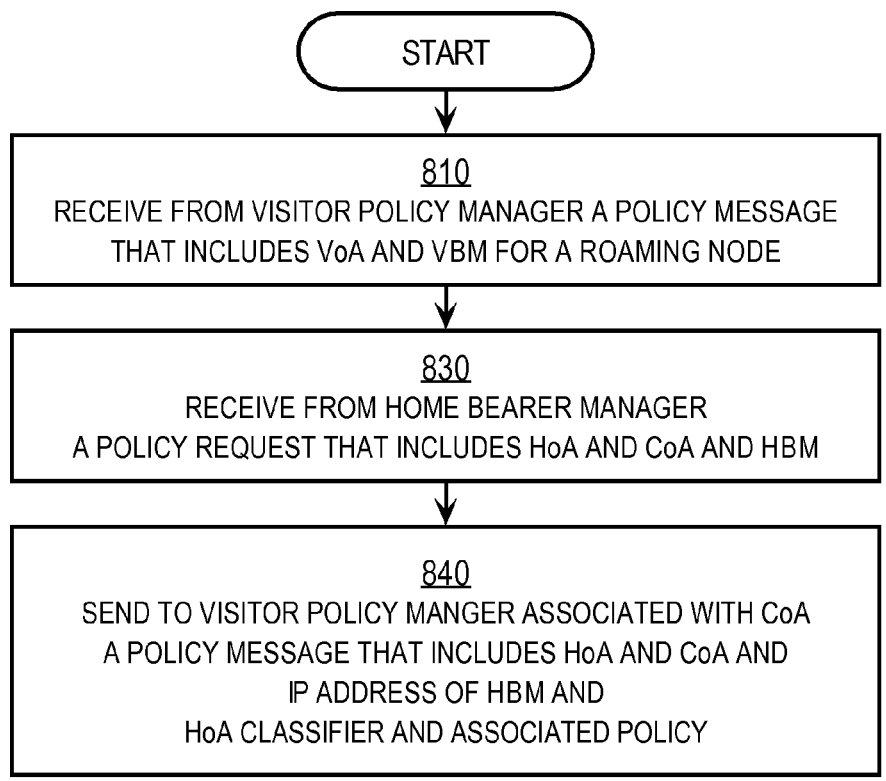
FIG. 8 illustrates at a high level an example method at a home policy manager for applying policy in a visited network based on the HoA.

FIG. 8 illustrates at a high level an example method 800 at a home policy manager for applying policy in a visited network based on the HoA. Method 800 is another embodiment of method 505 and is depicted in FIG. 1 as process 153 on VPM 124. In this embodiment, step 506 of method 505 includes step 810 and step 830; and step 507 of method 505 includes step 840.

In step 810, the home policy manager receives from a visitor policy manager a policy peering message that indicates a VoA and VBM for a roaming terminal of a subscriber. For example, HPM 124 receives from VPM 134 policy peering message 441 that indicates a subscriber for MT 114, a VoA for MT 114 and a VBM for MT 114. For purposes of illustration, it is assumed that the subscriber, VoA, VPM and VBM are as listed in Table 4: Subscriber=Alice; VoA=VIP1, VPM=VPM1, and VBM=VBM1.

In step 830 the home policy manager receives a policy request from the home bearer manager that includes roaming terminal registration data HoA and CoA for a subscriber. For example, HPM 124 receives from HBM 128 policy request message 431 with HoA=HIP1 and CoA=VIP1 for subscriber Alice. As a result of step 830, the HPM 124 associates the data listed in Table 9 for HBM1.

TABLE 9

| Further Example MIP CCoA information associated at home policy manager | | |
|---|---|---|
| Subscriber | HoA | CoA |
| Alice | HIP1 | VIP1 |

In step 840, the home policy manager sends to the visitor policy manager associated with the CoA a policy message that includes data that indicates the HBM, HoA, CoA and polices for a MIP tunnel, including a flow classifier for any PFO policies. Step 840 includes associating the HoA and CoA of the message 431 with a VPM in a message 441. For example, the data of Table 9 is associated with the data of Table 4 because the CoA of Table 9 appears in the VoA column of Table 4 for the same subscriber, Alice. The VPM for that same line is VPM1. Therefore, in this example, HPM 124 sends a message to VPM1 (e.g., VPM 134) that indicates the policy and classifier for HoA=HIP1, along with the CoA=VIP1 and HBM=HBM1. This allows VPM 134 to apply this policy for HoA=HIP1 on VBM 138 in the visited network for traffic to HBM1, as shown with reference to FIG. 9.

Figure 9:
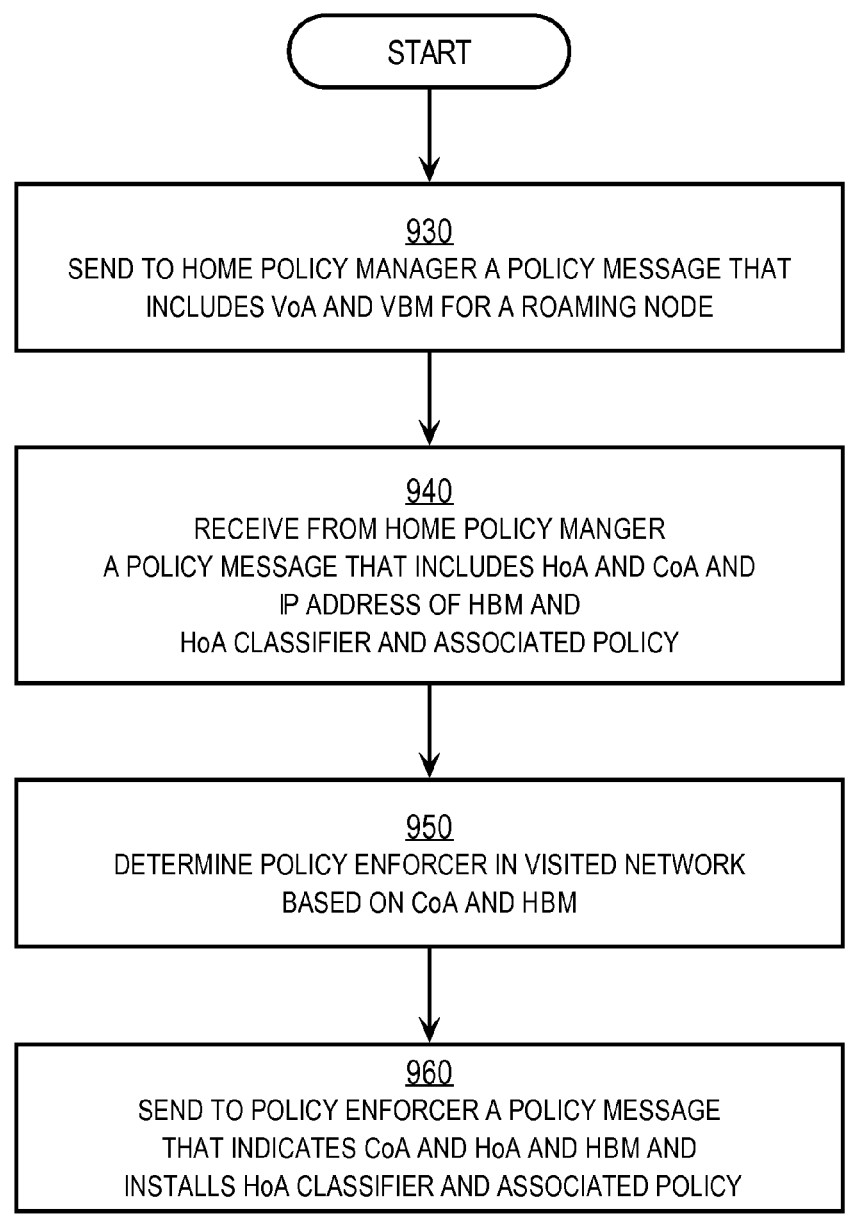
FIG. 9 illustrates at a high level an example method at a visitor policy manager for applying policy in a visited network based on the HoA.

FIG. 9 illustrates at a high level an example method 900 at a visitor policy manager for applying policy in a visited network based on the HoA. Method 900 is one embodiment of method 501 and is depicted in FIG. 1 as process 154 on VPM 134. In this embodiment, step 502 of method 501 includes step 940; and step 503 of method 501 includes step 950 and step 960.

In some embodiments, method 900 also includes step 930. In step 930, the visitor policy manger sends to the home policy manager a policy peering message that indicates a VoA and VBM for a roaming terminal of a subscriber. For example, as described above for step 810, VPM 134 sends a policy peering message 441 that indicates a subscriber for MT 114, a VoA for MT 114 and a VBM for MT 114. For purposes of illustration, it is assumed that the subscriber, VoA, VPM and VBM are as listed in Table 4: Subscriber=Alice; VoA=VIP1, VPM=VPM1, and VBM=VBM1.

In step 940, the visitor policy manager receives from the home policy manager a policy message that includes data that indicates the HBM, HoA, CoA and polices for a MIP tunnel, including a flow classifier for any PFO policies. For example, VPM 134 receives a message that indicates the policy and classifier for HoA=HIP1, along with the CoA=VIP1.

In step 950, the VPM determines the policy applying node based on the CoA. In some embodiments, the VPM determines the policy applying node based on the VBM address included explicitly in the message from the HPM. The VPM associates a VoA with a VBM based on a policy request received from the VBM for VoA policies when the roaming terminal registers. For example, in policy request message 230 from VBM 138 depicted in FIG. 2A, a policy for VoA=VIP1 was requested. Since this message 230 came from address VBM1 of VBM 138, the VPM 134 associates VoA=VIP1 with VBM1. The CoA=VIP1 in the message received in step 940. Therefore in Step 950, the VPM 134 determines that the VBM1 for VBM 138 is the policy enforcing node for CoA=VIP1.

In step 960, a policy install message is sent to the policy applying node. The policy install message includes policy data to be applied to data traffic that includes the HoA and data that indicates the CoA and HBM addresses for a MIP tunnel. The policy data indicates the HoA and any flow classifiers for PFO policies. For example, install policy message 435 is sent from VPM 134 to VBM 138. At VBM 138, the install policy message 437 is received and used to apply the policy as described above with reference to FIG. 6A and FIG. 6B.

Advantages of illustrated embodiments include:
1] per-user control of HoA traffic is allowed on the visitor bearer manager and the IPGW;
2] per-flow control of HoA traffic is allowed on the visitor bearer manager and the IPGW;
3] the policy layer is not burdened with the details of the Mobile IP (MIP) tunneling (CCoA of MIP version 4 or version 6, or FCoA of MIP version 4);
4] the MIP is not modified to install the policies; and
5] the policy installation remains in a policy layer separate from the other protocols.

4.0 Implementation Mechanisms—Hardware Overview

Figure 10:
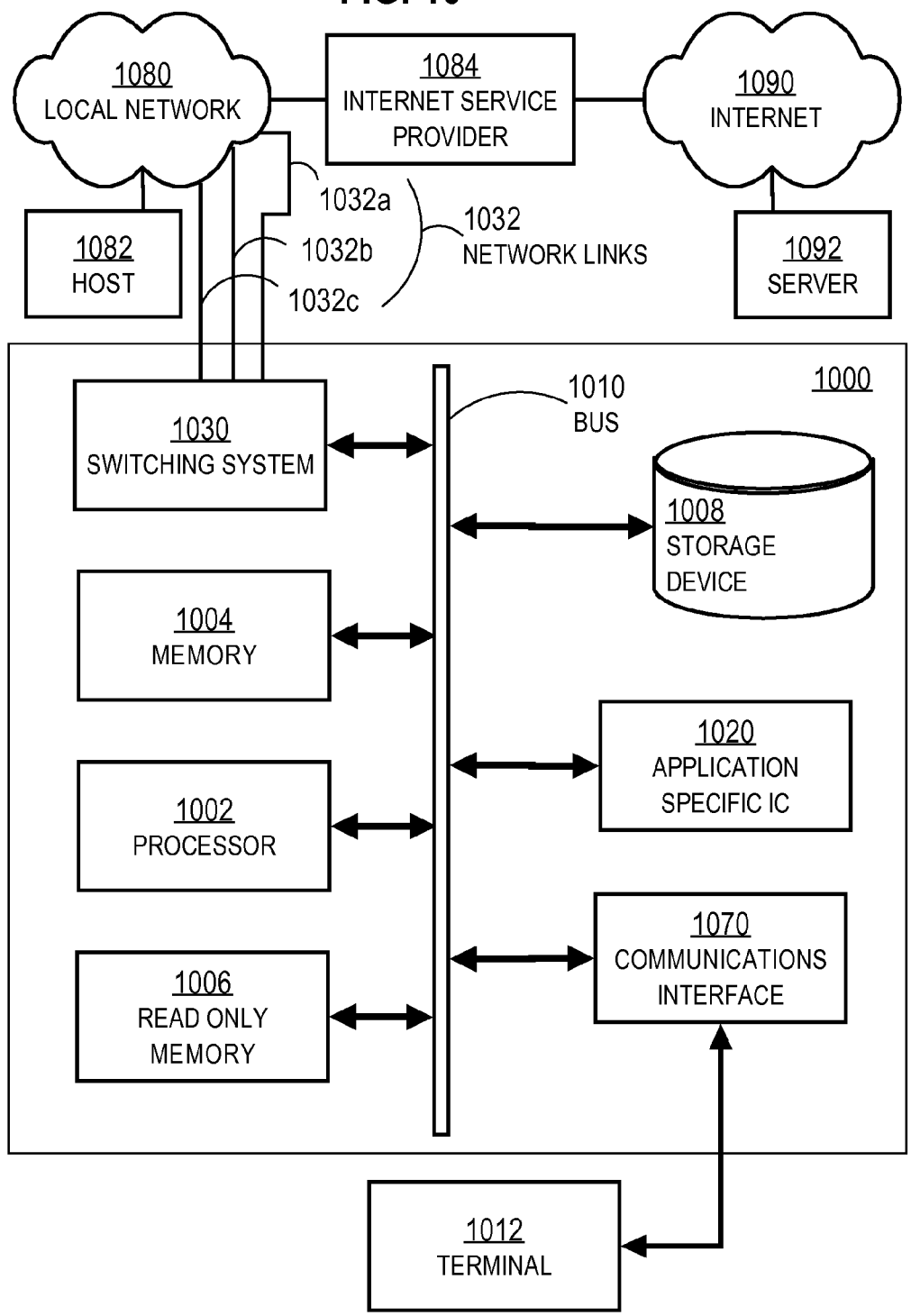
FIG. 10 illustrates a computer system upon which an embodiment may be implemented.

FIG. 10 illustrates a computer system 1000 upon which an embodiment may be implemented. The preferred embodiment is implemented using one or more computer programs running on a network element such as a router device. Thus, in this embodiment, the computer system 1000 is a router.

Computer system 1000 includes a communication mechanism such as a bus 1010 for passing information between other internal and external components of the computer system 1000. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 1010 includes many parallel conductors of information so that information is transferred quickly among devices coupled to the bus 1010. One or more processors 1002 for processing information are coupled with the bus 1010. A processor 1002 performs a set of operations on information. The set of operations include bringing information in from the bus 1010 and placing information on the bus 1010. The set of operations also typically include comparing two or more units of information, shifting positions of units of information, and combining two or more units of information, such as by addition or multiplication. A sequence of operations to be executed by the processor 1002 constitutes computer instructions.

Computer system 1000 also includes a memory 1004 coupled to bus 1010. The memory 1004, such as a random access memory (RAM) or other dynamic storage device, stores information including computer instructions. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of computer instructions. The computer system 1000 also includes a read only memory (ROM) 1006 or other static storage device coupled to the bus 1010 for storing static information, including instructions, that is not changed by the computer system 1000. Also coupled to bus 1010 is a non-volatile (persistent) storage device 1008, such as a magnetic disk or optical disk, for storing information, including instructions, that persists even when the computer system 1000 is turned off or otherwise loses power.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 1010 for use by the processor from an external terminal 1012, such as a terminal with a keyboard containing alphanumeric keys operated by a human user, or a sensor. A sensor detects conditions in its vicinity and transforms those detections into signals compatible with the signals used to represent information in computer system 1000. Other external components of terminal 1012 coupled to bus 1010, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 1012. In some embodiments, terminal 1012 is omitted.

Computer system 1000 also includes one or more instances of a communications interface 1070 coupled to bus 1010. Communication interface 1070 provides a two-way communication coupling via transmission media to a variety of external devices that operate with their own processors, such as printers, scanners, external disks, and terminal 1012. Firmware or software running in the computer system 1000 provides a terminal interface or character-based command interface so that external commands can be given to the computer system. For example, communication interface 1070 may be a parallel port or a serial port such as an RS-232 or RS-422 interface, or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented using carrier waves. For wireless links, the communications interface 1070 sends and receives electrical, acoustic or electromagnetic signals, including infrared and optical signals, which carry information streams, such as digital data.

In the illustrated embodiment, special purpose hardware, such as an application specific integrated circuit (IC) 1020, is coupled to bus 1010. The special purpose hardware is configured to perform operations not performed by processor 1002 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 1000 includes switching system 1030 as special purpose hardware for switching information for flow over a network. Switching system 1030 typically includes multiple communications interfaces, such as communications interface 1070, for coupling to multiple other devices. In general, each coupling is with a network link 1032 that is connected to another device in or attached to a network, such as local network 1080 in the illustrated embodiment, to which a variety of external devices with their own processors are connected. In some embodiments, an input interface or an output interface or both are linked to each of one or more external network elements. Although three network links 1032a, 1032b, 1032c are included in network links 1032 in the illustrated embodiment, in other embodiments, more or fewer links are connected to switching system 1030. Network links 1032 typically provides information communication via transmission media through one or more networks to other devices that use or process the information. For example, network link 1032b may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090. A computer called a server 1092 connected to the Internet provides a service in response to information received over the Internet. For example, server 1092 provides routing information for use with switching system 1030.

The switching system 1030 includes logic and circuitry configured to perform switching functions associated with passing information among elements of network 1080, including passing information received along one network link, e.g. 1032a, as output on the same or different network link, e.g., 1032c. The switching system 1030 switches information traffic arriving on an input interface to an output interface according to pre-determined protocols and conventions that are well known. In some embodiments, switching system 1030 includes its own processor and memory to perform some of the switching functions in software. In some embodiments, switching system 1030 relies on processor 1002, memory 1004, ROM 1006, storage 1008, or some combination, to perform one or more switching functions in software. For example, switching system 1030, in cooperation with processor 1004 implementing a particular protocol, can determine a destination of a packet of data arriving on input interface on link 1032a and send it to the correct destination using output interface on link 1032c. The destinations may include host 1082, server 1092, other terminal devices connected to local network 1080 or Internet 1090, or other routing and switching devices in local network 1080 or Internet 1090.

Some embodiments are related to the use of computer system 1000 for implementing the techniques described herein. According to one embodiment, those techniques are performed by computer system 1000 in response to processor 1002 executing one or more sequences of one or more instructions contained in memory 1004. Such instructions, also called software and program code, may be read into memory 1004 from another computer-readable medium such as storage device 1008. Execution of the sequences of instructions contained in memory 1004 causes processor 1002 to perform the method steps described herein. In alternative embodiments, hardware, such as application specific integrated circuit 1020 and circuits in switching system 1030, may be used in place of or in combination with software. Thus, embodiments are not limited to any specific combination of hardware and software, unless otherwise explicitly stated.

The signals transmitted over network link 1032 and other networks via transmission media through communications interfaces such as interface 1070, carry information to and from computer system 1000. Computer system 1000 can send and receive information, including program code, through the networks 1080, 1090 among others, through network links 1032 and communications interfaces such as interface 1070. In an example using the Internet 1090, a server 1092 transmits program code for a particular application, requested by a message sent from computer 1000, through Internet 1090, ISP equipment 1084, local network 1080 and network link 1032*b* through communications interface in switching system 1030. The received code may be executed by processor 1002 or switching system 1030 as it is received, or may be stored in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1032*b*. An infrared detector serving as communications interface in switching system 1030 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002 or switching system 1030.

5.0 Extensions and Alternatives

In the foregoing specification, specific embodiments have been described. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A method comprising:
identifying, at a visited node in a visited network, that a particular mobile terminal is a roaming terminal within the visited network, the roaming terminal having a home network;
identifying a home network node hosting a home bearer manager process for the home network of the roaming terminal;
determining a care-of address associated with the roaming terminal in the visited network, wherein the care-of address corresponds to at least one of an address of the visited node and a visited network IP address for the roaming terminal in the visited network;
receiving, at the visited node via one or more messages exchanged with the home network node, policy for the roaming terminal from a home policy manager of the home network of the roaming terminal, wherein the policy is associated with a home Internet Protocol (IP) address of the roaming terminal; and
applying the policy, in the visited network, to data packets that include the home IP address, wherein each of the data packets includes an encapsulated payload and a plurality of IP headers including an outer IP header and one or more inner IP headers, and applying the policy to the data packets in the visited network includes determining from the determined care-of address a particular one of the plurality of IP headers identifying the home IP address.

2. The method as recited in claim 1, wherein:
the visited node in the visited network includes a visitor policy manager process; and
receiving the policy further comprises receiving data that indicates
the policy to be applied to data packets that include the home IP address of the roaming terminal, and
the care-of-address in the visited network for an endpoint of a Mobile IP (MIP) tunnel for data packets for the roaming terminal.

3. The method as recited in claim 2, wherein receiving the policy further comprises receiving data that indicates an IP address for the home network node that hosts the home bearer manager process, wherein the home bearer manager process is configured to pass all data packets in the home network for the roaming terminal.

4. The method as recited in claim 2, wherein applying the policy further comprises:
determining, based on the care-of-address, a visitor bearer manager process in the visited network, wherein the visitor bearer manager process is configured to pass all data packets for the roaming terminal; and
sending, to the visitor bearer manager process, data that indicates the policy, the home IP address, and the care-of-address.

5. The method as recited in claim 2, wherein the care-of address is an IP address for a node that hosts the visitor bearer manager.

6. The method as recited in claim 2, wherein the care-of address is an IP address of the visited network for the roaming terminal.

7. The method as recited in claim 2, wherein sending, to the visitor bearer manager process, data that indicates the policy, the home IP address, and the care-of-address further comprises sending, to the visitor bearer manager process, data that indicates an IP address for the home network node that hosts the home bearer manager process, wherein the home bearer manager process is configured to pass all data packets in the home network for the roaming terminal.

8. The method as recited in claim 2, further comprising sending, to the home policy manager process in the home network, registration data that indicates an IP address of the visited network for the roaming terminal and a visitor bearer manager process in the visited network, wherein the visited bearer manager process is configured to pass all data packets for the roaming terminal.

9. The method as recited in claim 2, wherein receiving the policy further comprises receiving policy in a message from the home network policy manager process in the home network.

10. The method as recited in claim 1, wherein the policy associated with the home IP address is at least one of a billing policy or a quality of service (QoS) policy or a packet flow optimization (PFO) policy.

11. The method as recited in claim 1, wherein:
the visited node in the visited network is a node that hosts a visitor bearer manager process that is configured to pass all data packets for the roaming terminal in the visited network; and
receiving the policy further includes receiving data that indicates
the policy to be applied to data packets that include the home IP address of the roaming terminal, and
the care-of-address in the visited network for an endpoint of a Mobile IP (MIP) tunnel for data packets for the roaming terminal.

12. The method as recited in claim 11, wherein receiving the policy further comprising receiving data that indicates an IP address for the home network node that hosts the home bearer manager process, wherein the home bearer manager process is configured to pass all data packets in the home network for the roaming terminal.

13. The method as recited in claim 11, wherein
if it is determined that the IP address of the visited node is the care-of-address, classifier a first one of the one or more inner IP headers, at a first encapsulation depth, is identified as including the home IP address.

14. The method as recited in claim 13, wherein if it is determined that a visited network IP address (VoA) for the roaming terminal is the care-of-address, a second one of the one or more inner IP headers, at a second encapsulation depth deeper than the first depth, is identified as including the home IP address.

15. A method comprising:
receiving, at a node of a home network of a terminal, from a visited network, registration data for the terminal while the terminal is roaming in the visited network;
identifying, at the node of the home network, from the received registration data, a subscriber associated with the terminal;
determining a care-of address associated with the terminal during roaming in the visited network, wherein the care-of address corresponds to at least one of an address of a visited node in the visited network hosting and a visited network IP address assigned to the terminal in connection with the terminal's roaming in the visited network;
identifying, at the node of the home network, policy data corresponding to the subscriber; and
sending, to the visited network, the policy data that indicates how to apply policy in the visited network to data packets that include a home Internet Protocol (IP) address of the terminal for the home network, wherein each of the data packets includes an encapsulated payload and a plurality of IP headers including an outer IP header and one or more inner IP headers, and the policy data includes an identification of the care-of address for use in identifying a particular one of the one or more inner IP headers identifying the home IP address.

16. The method as recited in claim 15, wherein receiving the registration data further comprises receiving the registration data that indicates:
an identifier for a subscriber who owns the terminal; and
the care-of-address in the visited network for an endpoint of a Mobile IP (MIP) tunnel for data packets for the terminal.

17. The method as recited in claim 16, wherein sending the data that indicates how to apply the policy further comprises sending data that indicates the home IP address of the terminal.

18. The method as recited in claim 16, wherein sending the data that indicates how to apply the policy further comprises sending data that indicates an IP address for a home bearer manager process that is configured to pass all data packets for the terminal in the home network.

19. The method as recited in claim 17, wherein:
the node in the home network is a node that hosts a home bearer manager process that is configured to pass all data packets for the terminal in the home network;
the method further comprises determining the home IP address; and
sending to the visited network the data that indicates how to apply the policy further comprises sending the data that indicates the subscriber and the home IP address to a home policy manager in the home network, which sends to the visited network data that indicates how to apply the policy.

20. The method as recited in claim 17, wherein:
the node in the home network is a home policy manager that stores policy associated with a subscriber of the network;
the registration data is received from a home bearer manager process that is configured to pass all data packets for the terminal in the home network;
the registration data indicates the home IP address of the terminal; and
sending to the visited network the data that indicates how to apply the policy further comprises sending the data to a visitor policy manager process in the visited network.

21. The method as recited in claim 20, wherein:
receiving the registration data further comprises receiving, from the visitor policy manager process, visited network registration data that indicates a visited network IP address (VoA) for the terminal while roaming in the visited network and the visitor bearer manager in the visited network that is configured to pass all data packets for the terminal in the visited network; and
sending data that indicates how to apply the policy further comprises determining the visitor policy manager to receive the data based on the visited network registration data and the care-of-address.

22. An apparatus comprising:
a network interface;
logic encoded in one or more tangible media for execution and, when executed, operable to:
identify, a visited node in a visited network, that a particular mobile terminal is a roaming terminal within the visited network, the roaming terminal having a home network;
identify a home network node hosting a home bearer manager process for the home network of the roaming terminal;
determining a care-of address associated with the roaming terminal in the visited network, wherein the care-of address corresponds to at least one of an address of the visited node and a visited network IP address for the roaming terminal in the visited network;
receive, via one or more messages exchanged with the home network node, policy for the roaming terminal from a home policy manager of the home network of the roaming terminal, wherein the policy is associated with a home Internet Protocol (IP) address of the roaming terminal; and
apply the policy, in the visited network, to data packets that include the home IP address, wherein if it is determined that the IP address of the visited node is the care-of-address, a regular classifier is defined that is configured to use an inner IP header to classify a flow of data packets from the roaming terminal to which a policy is applied, and if it is determined that the visited network IP address for the roaming terminal is the care-of-address, a tunnel classifier is defined that uses both an IP header and an outer IP header to classify a flow of data packets from the roaming terminal to which the policy is applied.

23. The apparatus as recited in claim 22, wherein:

the logic when executed is further operable to perform a visitor policy manager process; and receive the policy further comprises receive data that indicates the policy to be applied to data packets that include the home IP address of the roaming terminal, and the care-of-address in the visited network for an endpoint of a Mobile IP (MIP) tunnel for data packets for the roaming terminal.

24. The apparatus as recited in claim 23, wherein apply the policy further comprises:

determine, based on the care-of-address, a visitor bearer manager process in the visited network, wherein the visitor bearer manager process is configured to pass all data packets for the roaming terminal; and send, to the visitor bearer manager process, data that indicates the policy, the home IP address, and the care-of-address.

25. An apparatus comprising:

a network interface;

logic encoded in one or more tangible media for execution and, when executed, operable to:

receive from a visited network, registration data for a terminal of a home network while the terminal is roaming in the visited network;

identify, at a node of the home network, from the received registration data, a subscriber associated with the terminal;

determine a care-of address associated with the terminal during roaming in the visited network, wherein the care-of address corresponds to at least one of an address of a visited node in the visited network hosting and a visited network IP address assigned to the terminal in connection with the terminal's roaming in the visited network;

identify, at the node of the home network, policy data corresponding to the subscriber; and send, to the visited network, the policy data that indicates how to apply policy in the visited network to data packets that include a home Internet Protocol (IP) address of the terminal, wherein each of the data packets includes an encapsulated payload and a plurality of IP headers including an outer IP header and one or more inner IP headers, and the policy data includes an identification of the care-of address for use in identifying a particular one of the one or more inner IP headers identifying the home IP address.

* * * * *